(12) United States Patent
Kyotani et al.

(10) Patent No.: US 10,053,302 B2
(45) Date of Patent: Aug. 21, 2018

(54) CONTAINER RAISING/LOWERING CONVEYANCE APPARATUS

(71) Applicant: Daifuku Co., Ltd., Osaka (JP)

(72) Inventors: Hisashi Kyotani, Shiga (JP); Kazuki Ogawa, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/355,320

(22) Filed: Nov. 18, 2016

(65) Prior Publication Data

US 2017/0066604 A1   Mar. 9, 2017

Related U.S. Application Data

(63) Continuation of application No. PCT/JP2015/066197, filed on Jun. 4, 2015.

(30) Foreign Application Priority Data

Jun. 13, 2014   (JP) .................. 2014-122246

(51) Int. Cl.
*B65G 47/90* (2006.01)
*B66C 1/10* (2006.01)
*B65G 1/04* (2006.01)

(52) U.S. Cl.
CPC .............. *B65G 47/90* (2013.01); *B65G 1/04* (2013.01); *B66C 1/10* (2013.01)

(58) Field of Classification Search
CPC .... B65G 1/0407; B65G 1/0464; B65G 47/90; B65G 47/901; B65G 47/902; B65G 63/004; B66C 1/101; B66C 1/102; B66C 1/104; B66C 1/425; B66C 1/427; B66C 19/002; B66C 19/007
USPC .................................. 414/140.3, 141.3, 561
See application file for complete search history.

(56) References Cited

U.S. PATENT DOCUMENTS

| 6,464,069 B1 * | 10/2002 | Rich | .................. H05K 13/0408 |
| | | | 198/468.3 |
| 2016/0001992 A1 * | 1/2016 | Takao | .................... B65G 47/90 |
| | | | 414/788.4 |

FOREIGN PATENT DOCUMENTS

| CA | 2899365 A1 * | 9/2014 | ............. B65G 47/90 |
| JP | H06115608 A | 4/1994 | |
| WO | 2014142107 A1 | 9/2014 | |

* cited by examiner

*Primary Examiner* — Saul Rodriguez
*Assistant Examiner* — Brendan P Tighe
(74) *Attorney, Agent, or Firm* — St. Onge Steward Johnston & Reens LLC

(57) ABSTRACT

A container raising/lowering conveyance apparatus including four gripping raising/lowering bodies capable of being respectively horizontally fitted to and detached from four corners of an article-conveyance container is configured such that, in a planar view, central raising/lowering link members capable of being raised and lowered are disposed at central positions of respective edges of a right-angled parallelogram surrounded by the four gripping raising/lowering bodies, and each of the central raising/lowering link members and the gripping raising/lowering bodies at both sides thereof are coupled to each other by at least one pair of upper and lower rocking parallel links capable of rocking in the vertical direction.

3 Claims, 25 Drawing Sheets

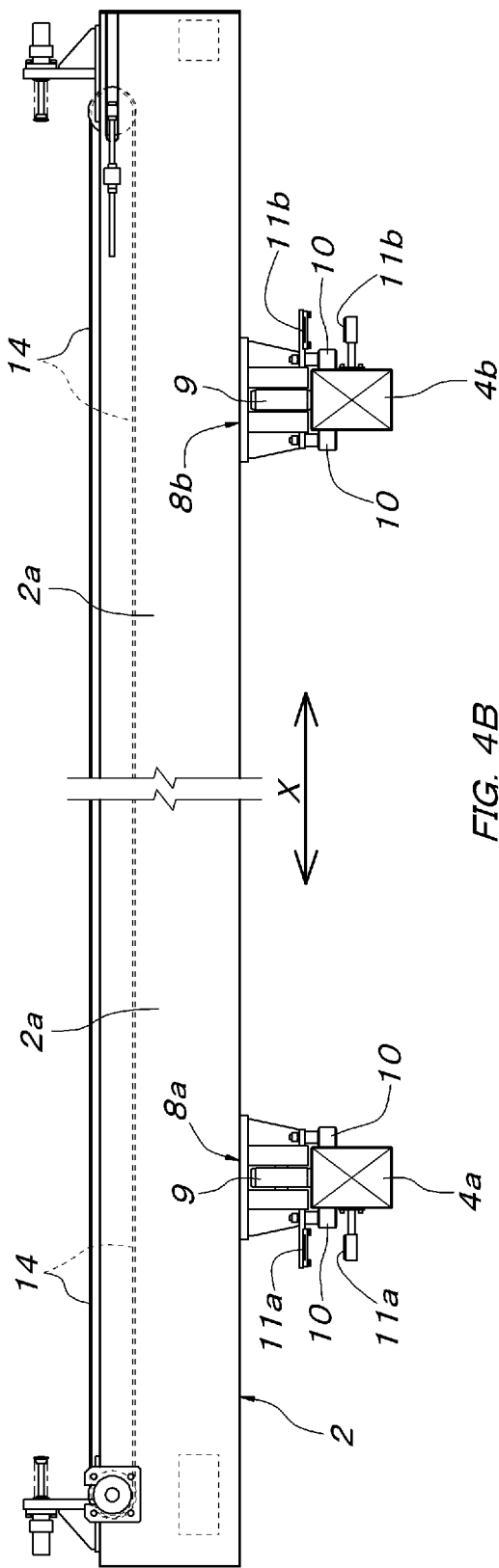
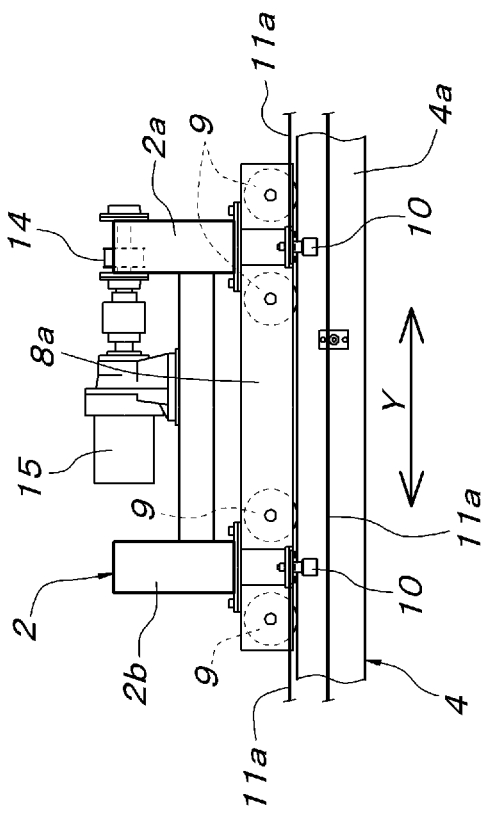

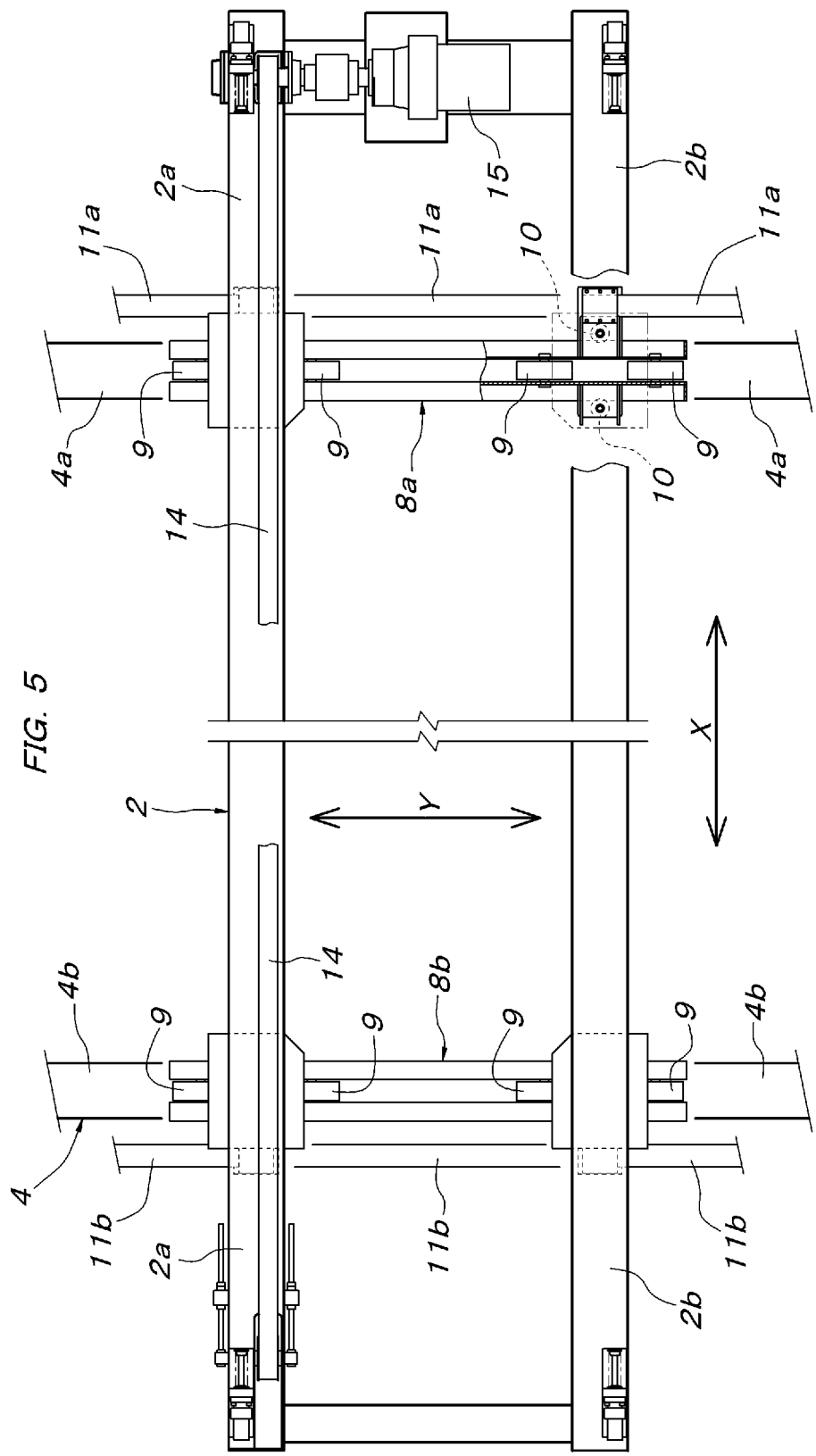

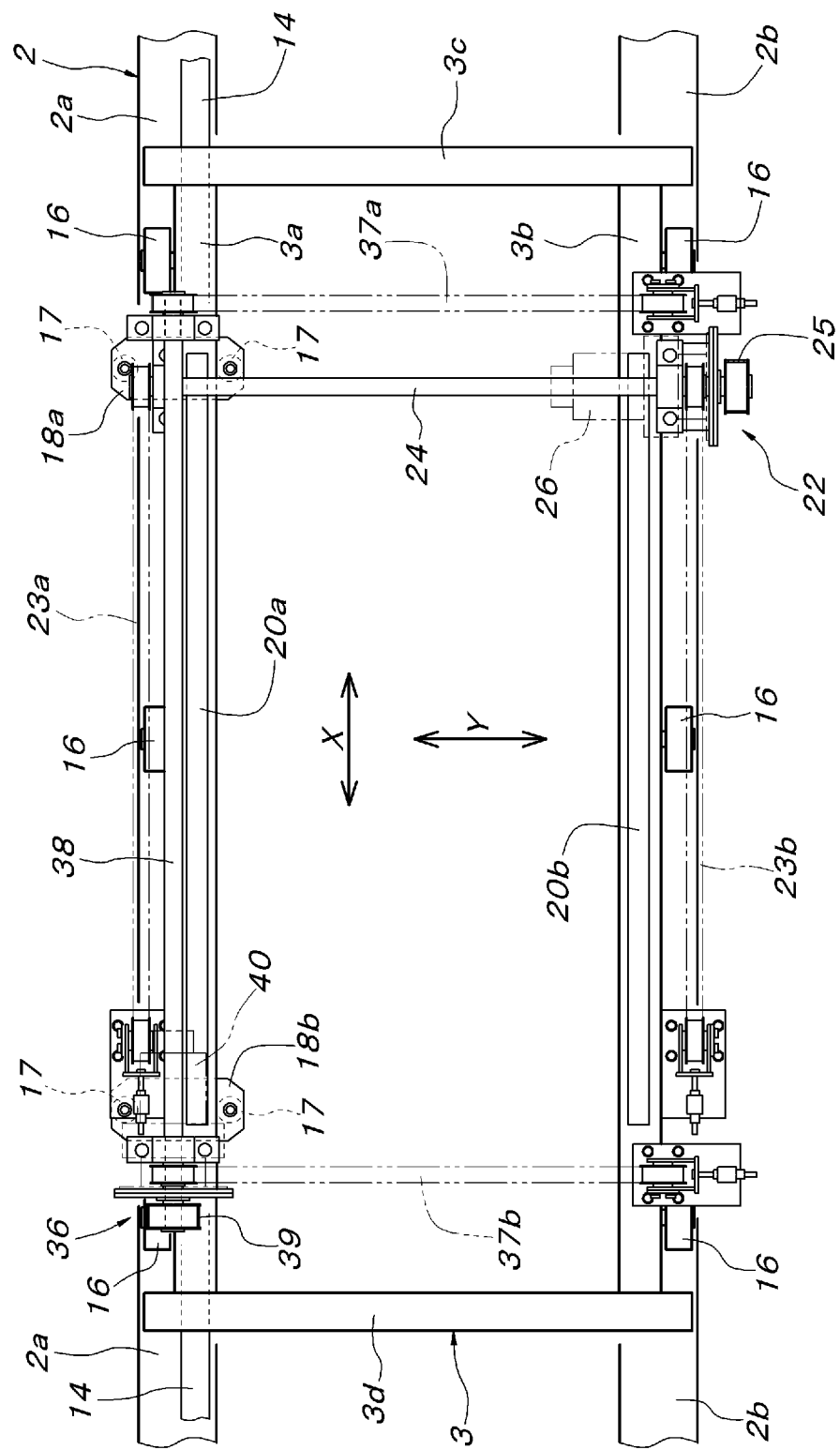

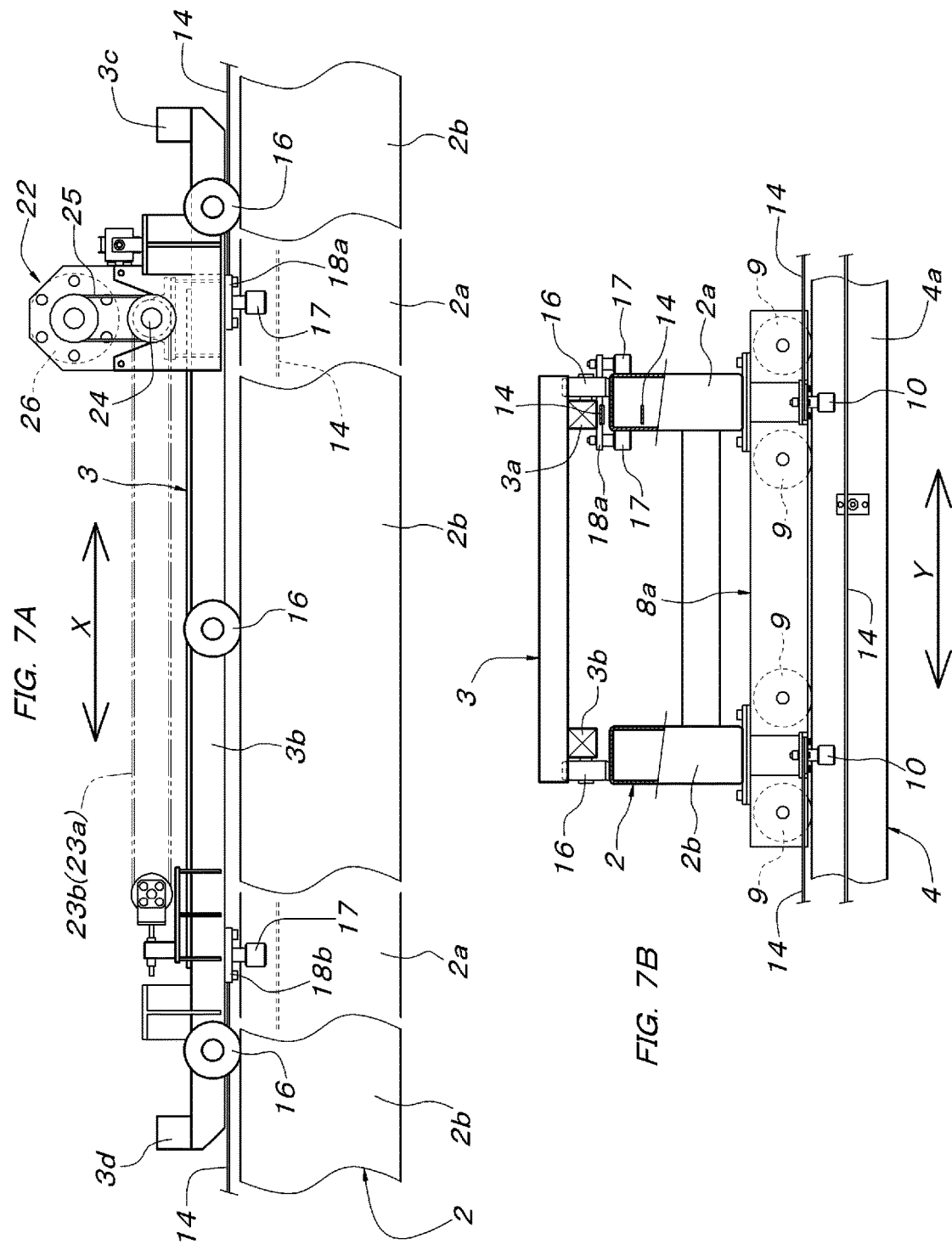

FIG. 21A
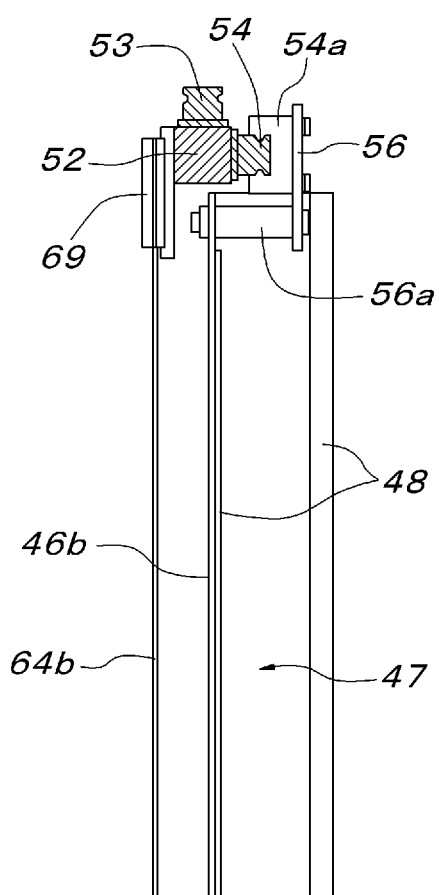
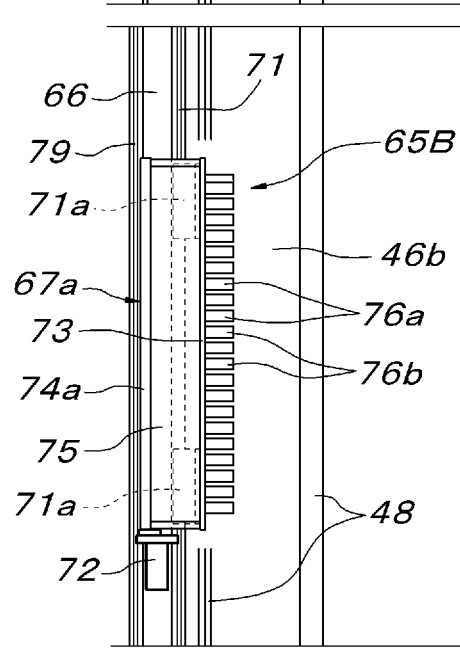
FIG. 21B
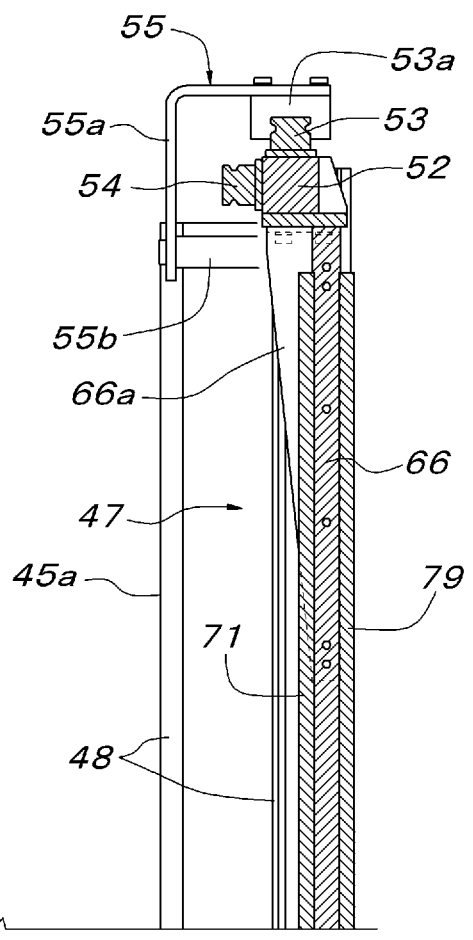
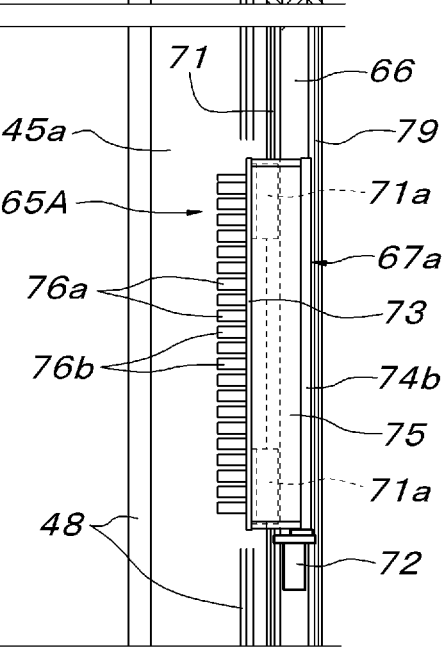

CONTAINER RAISING/LOWERING CONVEYANCE APPARATUS

FIELD OF THE INVENTION

The present invention relates to a conveyance apparatus that lifts and conveys a stackable, article-conveyance box-type container with a right-angled parallelogram planar shape.

BACKGROUND OF THE INVENTION

As an example of a conveyance apparatus capable of raising/lowering and conveying a box-type container, there is known, for example, a container raising/lowering conveyance apparatus where, as described in Japanese Published Unexamined Patent Application No. H06-115608 (Patent Literature 1), a raising/lowering body is provided that is suspended from a ceiling traveling crane type traveling body so as to be capable of being raised and lowered and container suspending hooks are provided so as to be capable of opening and closing at a lower side of the raising/lowering body. With this conveyance apparatus, engaged metal fittings, capable of being engaged with and disengaged from the container suspending hooks, are protruded at a ceiling surface of a container or a gap, with and from which the container suspending hooks can engage and disengage, is secured below a bottom surface of the container.

SUMMARY OF THE INVENTION

With the configuration described in Japanese Published Unexamined Patent Application No. H06-115608(Patent Literature 1) mentioned above, a prerequisite is that engaged metal fittings specialized for suspension are protruded from a ceiling surface of a container, which is the conveyed object, or a gap is formed below a bottom surface of the container, and a compact plastic container with an open upper side that can be lifted up and carried with both hands cannot be used as it is as the conveyed object. As a matter of course, a generally distributed plastic container has a reinforcing flange portion formed integrally and continuously in parallel to a peripheral direction mainly at an upper end side of its outer side surface as a reinforcing measure, and although a generally distributed compact plastic container such as mentioned above with an open upper side can thus be made an object of conveyance by using the suspending hooks in a manner of hooking onto the flange portion at two parallel side surfaces of the container, this type of container is frequently used in a state where a plurality of containers of the same planar size are stacked. In a case where such stacked containers are to be lifted and conveyed by the suspending hooks engaged with a flange portion of a container at a lowest stage of the stacked containers, the larger the number of containers stacked, the more unstable and the more difficult it is to perform conveying safely.

The present invention proposes a container raising/lowering conveyance apparatus capable of being utilized to solve the problems of the conventional art such as the above, and to describe by providing reference symbols in parentheses used in the description of embodiments below to facilitate understanding the relationship with the embodiments, the container raising/lowering conveyance apparatus according to the present invention has, in a container raising/lowering conveyance apparatus that includes four gripping raising/lowering bodies (45a to 46b) capable of being respectively horizontally fitted to and detached from four corners of an article-conveyance container (C), a configuration where central raising/lowering link members (82 and 88), capable of being raised and lowered, are disposed at central positions of respective edges of a right-angled parallelogram surrounded by the four gripping raising/lowering bodies (45a to 46b) in a planar view, and each of the central raising/lowering link members (82 and 88) and the gripping raising/lowering bodies (45a to 46b) at both sides thereof are coupled to each other by at least one pair of upper and lower rocking parallel links (83a to 84a and 89a to 90b) capable of rocking in the vertical direction.

The four gripping raising/lowering bodies in the container raising/lowering conveyance apparatus of the configuration described above are supported by a supporting structure, capable of horizontal fitting and detaching operations with respect to the four corners of the container and raising/lowering operations, and by using, as the supporting structure, a traveling body capable of traveling through or a movable arm rockable horizontally in a space above a container to be handled, the container raising/lowering conveyance apparatus of the above configuration can be utilized as a container conveyance means capable of moving and lowering a gripped and lifted container to and onto another location in accompaniment with operation of the traveling body or the movable arm. Also, a usage method is possible where the supporting structure is installed over a fixed position, a container conveyed by a conveying traveling body to the fixed position below the supporting structure is lifted once, and the container is then lowered onto another conveying traveling body sent to the fixed position. Further, although to enable the container to be lifted by upward movement in a state where the four gripping raising/lowering bodies of the present invention are fitted to the container corners, a means of preventing downward slipping movement of the container, such as an elastic material, an uneven surface, or a pin-shaped supporting implement capable of extending and retracting, etc., may be provided at each of portions being fitted to the container corners and a configuration may thereby be provided where the container to be conveyed can be lifted and conveyed by just the four gripping raising/lowering bodies, it is preferable that the four gripping raising/lowering bodies be used in particular as means for gripping an entirety of stacked containers from the periphery and holding it in a vertical orientation and to separately use in combination a lifting raising/lowering body by which at least a container of a lowest stage among the containers gripped by the four gripping raising/lowering bodies is lifted by utilizing a flange portion, etc., of a periphery of the container.

With any usage method, the four gripping raising/lowering bodies are lowered to a level of being fitted to the four corners of the container to be conveyed and thereafter moved horizontally closer to each other to fit the respective gripping raising/lowering bodies to the four corners of the container to be conveyed, and therefore the locations at which the respective gripping raising/lowering bodies grip the container are largely separated downward from the parts of the gripping raising/lowering bodies supported by the supporting structure. Therefore, when the respective gripping raising/lowering bodies grip the container, reaction forces of this action may cause the respective gripping raising/lowering bodies to deflect horizontally outward, thereby decreasing forces of gripping the container corners.

However, with the configuration of the present invention described above, the gripping raising/lowering bodies that are adjacent each other along each side surface of the gripped container are coupled to each other via the central raising/lowering link member at an intermediate position between the gripping raising/lowering bodies and the at least one pair of upper and lower rocking parallel links so that regardless of horizontal movements of the gripping raising/lowering bodies closer to and away from each other, all gripping raising/lowering bodies are constantly kept in mutually parallel vertical orientations and therefore during the operation in which the respective gripping raising/lowering bodies grip the container, the parts of the gripping raising/lowering bodies at which the container is gripped do not become tilted so as spread outward and the container corners can be gripped reliably by the respective gripping raising/lowering bodies. In other words, in comparison to a case of avoiding the abovementioned problem by increasing a bending strength of each gripping raising/lowering body, the respective gripping raising/lowering bodies can be made lightweight and reduced in cost and consequently, a load acting on a drive means for making the respective gripping raising/lowering bodies move horizontally closer to and away from each other can be lightened as well.

In implementing the container raising/lowering conveyance apparatus according to the present invention described above, a configuration may be provided such that in a state where the gripping raising/lowering bodies (45a to 46b) at both sides coupled to the central raising/lowering link members (82 and 88) are separated furthest from each other, the rocking parallel links (83a to 84b and 89a to 90b) are inclined obliquely upward from the corresponding central raising/lowering link members (82 and 88) toward the gripping raising/lowering bodies (45a to 46b) at both sides. With this configuration, gravity acting on each central raising/linking member acts to draw the gripping raising/lowering bodies at both sides inward toward each other, making the container gripping actions of the four gripping raising/lowering bodies even more reliable.

Also, a supporting structure (secondary traveling body (3)) may be provided with an X-direction pair of main movable bases (21a and 21b), capable of moving closer to and away from each other in an X direction, among the X direction and a Y direction that are parallel to mutually perpendicular side edges of a right-angled parallelogram surrounded by the four gripping raising/lowering bodies (45a to 46b) in a planar view, the main movable bases (21a and 21b) may be provided respectively with Y-direction pairs of secondary movable bases (30a to 31 b) capable of being moved closer to and away from each other in the Y direction, the four gripping raising/lowering bodies (45a to 46b) may be respectively and separately supported by the four secondary movable bases (30a to 31 b) so as to be capable of being raised and lowered, the central raising/lowering link members (88), positioned centrally between respective Y-direction pairs of gripping raising/lowering bodies (the pair 45a and 45b and the pair 46a and 46b), may be supported, so as to be capable of being raised and lowered, by vertical rod-shaped main bodies (66), which are supported by the respective main movable bases (21a and 21b) so as to be capable of being raised and lowered, upper end portions of the vertical rod-shaped main bodies (66) and upper end portions of the Y-direction pairs of gripping raising/lowering bodies (the pair 45a and 45b and the pair 46a and 46b) at both sides of the vertical rod-shaped main bodies (66) may be coupled by coupling means (51A and 51B), which allow the Y-direction pairs of gripping raising/lowering bodies (the pair 45a and 45b and the pair 46a and 46b) to be moved closer to and away from each other in the Y direction, and the respective main movable bases (21a and 21 b) may be provided with raising/lowering drive means (57A and 57B) that drive the raising and lowering of the X-direction pair of the vertical rod-shaped main bodies (66) supported by the respective main movable bases (21a and 21b).

With the present configuration, instead of making the four gripping raising/lowering bodies, which change in position in both the X and Y directions, be driven to be raised and lowered respectively and separately, it suffices that the vertical rod-shaped main bodies, which are capable of just being raised and lowered by the two X-direction main movable bases, are driven to be raised and lowered with respect to the main movable bases by the raising/lowering drive means installed on the main movable bases, and therefore the structure is made simple and implementation at low cost is made possible. Moreover, that which transmits the raising/lowering motion of each vertical rod-shaped main body to the gripping raising/lowering bodies at both sides thereof is the coupling means coupling the upper end portions of the vertical rod-shaped main body and the gripping raising/lowering bodies at both sides thereof to each other, and therefore an entire length of each gripping raising/lowering body can be put to use to grip the container, and each gripping raising/lowering body is thus supported at the two parts of the part supported by the secondary movable base so as to be capable of being raised and lowered and the upper end portion coupled via the coupling means to the corresponding vertical rod-shaped main body so that even a gripping raising/lowering body of long length can be made to operate with good stability, and each of the vertical rod-shaped main bodies required to provide such an effect can be used as a raising/lowering guide column of the central raising/lowering link member of a parallel link mechanism coupling the gripping raising/lowering bodies at both sides of the vertical rod-shaped main body to each other, and the function of keeping the gripping raising/lowering bodies in the vertical parallel orientations can thus be improved.

BRIEF DESCRIPTION OF DRAWINGS

FIG. 4A is a partially cutaway rear view showing main movable bases on the secondary traveling body,
and FIG. 4B is a side view thereof.
FIG. 5 is a partially cutaway plan view showing the main traveling body.
FIG. 6 is a plan view showing the secondary traveling body on the main traveling body.
FIG. 7A is a front view showing the secondary traveling body,
and FIG. 7B is a partial longitudinal sectional view showing the same secondary traveling body.

FIG. 21A is a partial longitudinal sectional front view showing a single lifting raising/lowering body and a single gripping raising/lowering body at the same side, and FIG. 21B is a partial longitudinal sectional front view showing another single lifting raising/lowering body and a single gripping raising/lowering body at the same side.

DETAILED DESCRIPTION OF THE INVENTION

Figure 1:
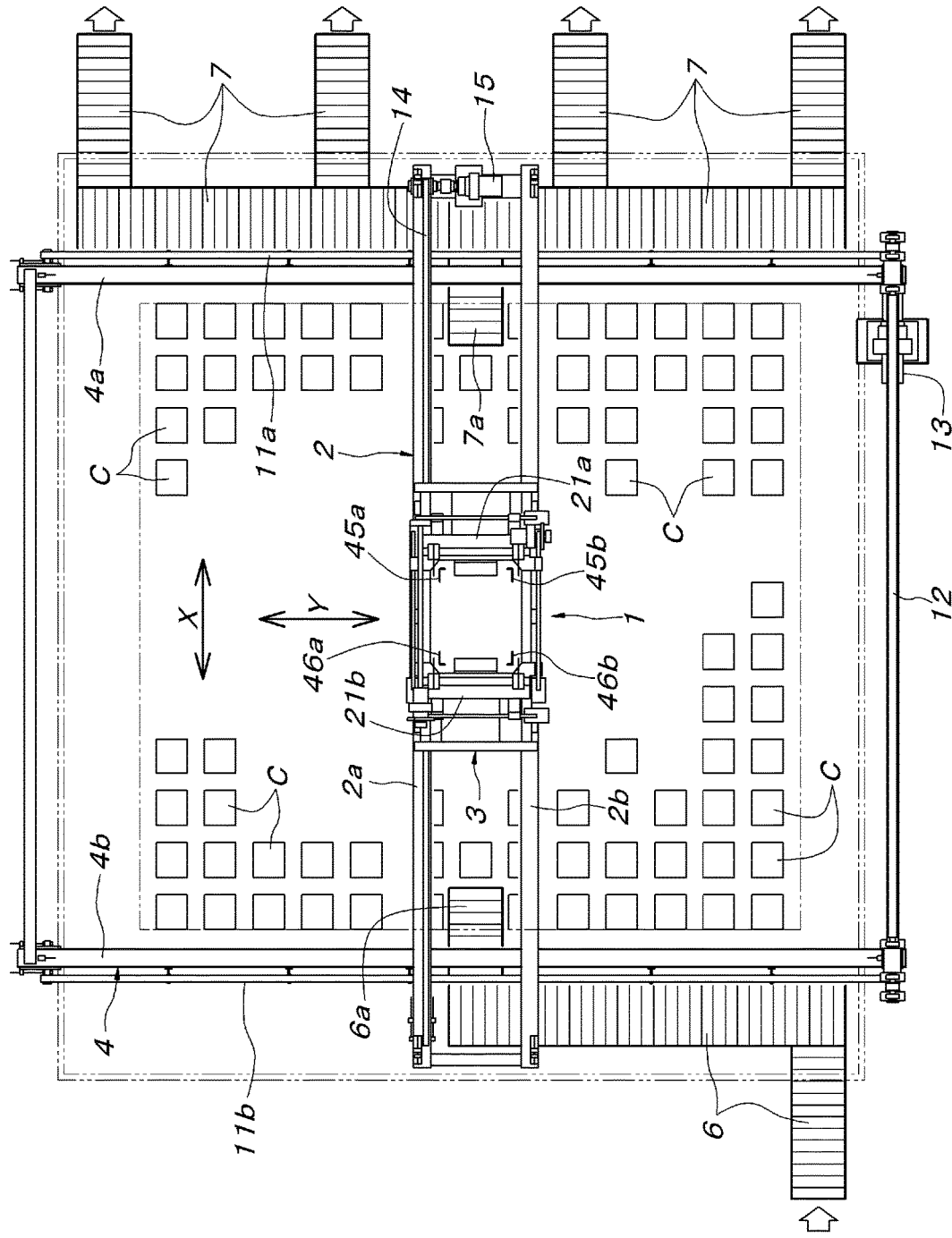
FIG. 1 is a plan view showing a storage facility.
Figure 2:
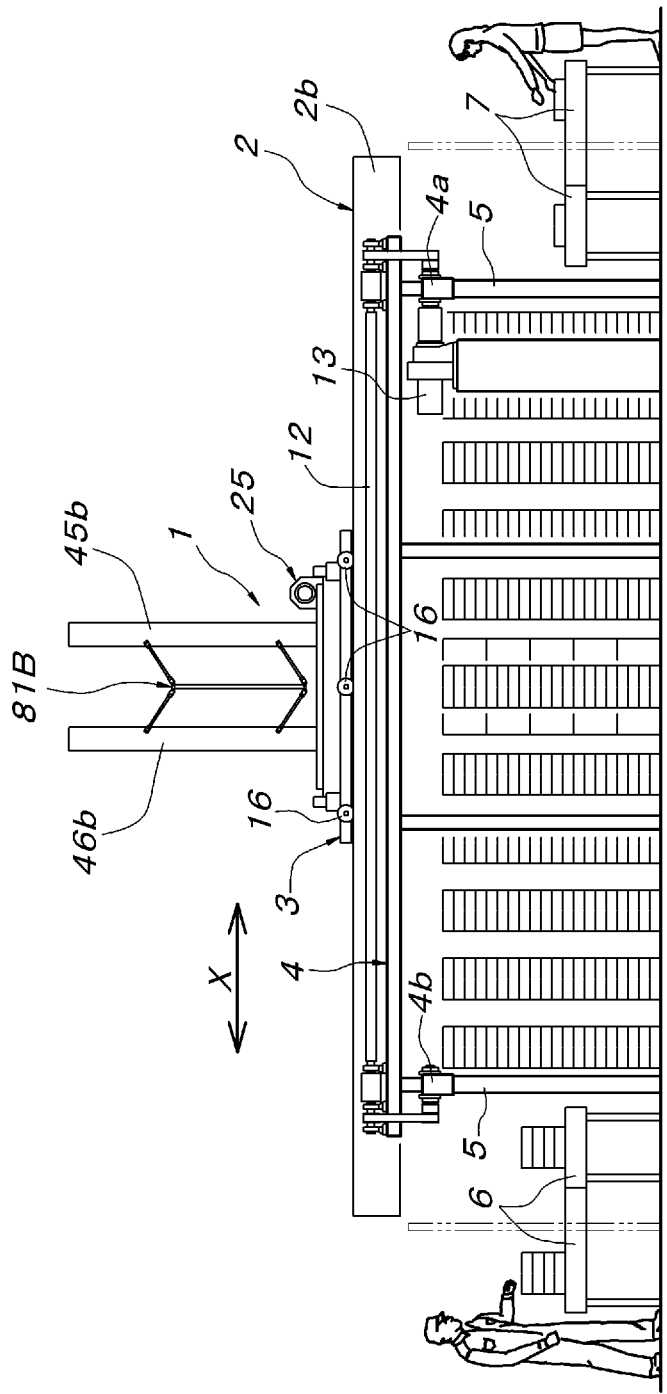
FIG. 2 is a front view of the same storage facility.
Figure 3:
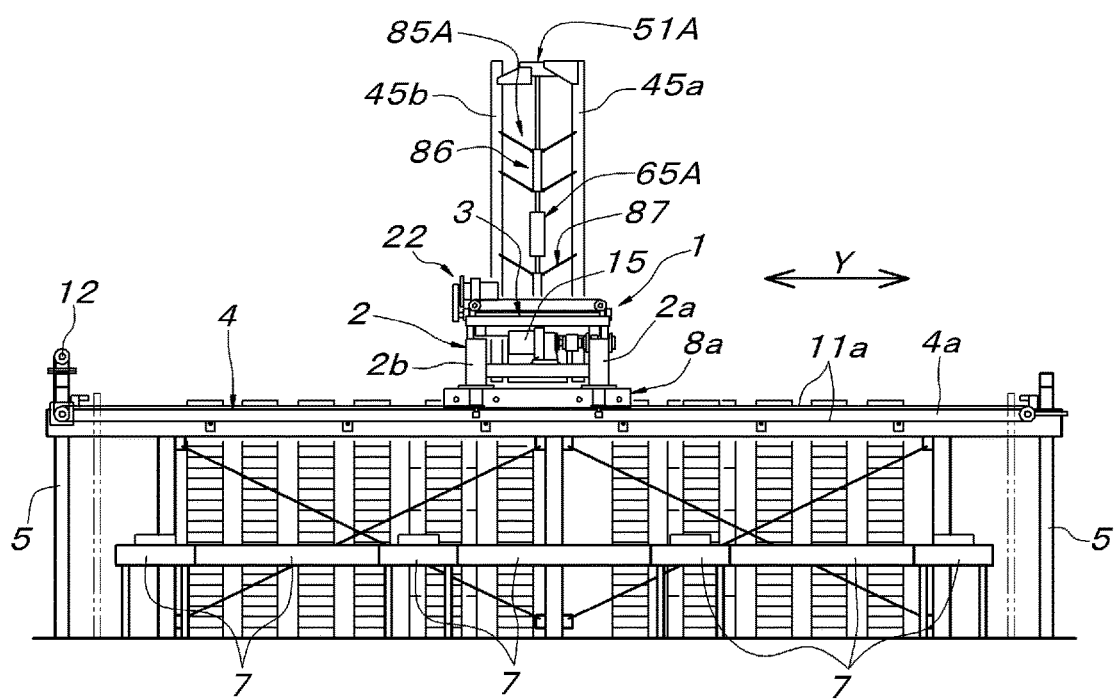
FIG. 3 is a side view of the same storage facility.

In FIG. 1 to FIG. 3, 1 is a ceiling traveling crane type conveyance apparatus and is installed at an upper side of a storage area configured with a flat floor surface with a right-angled parallelogram planar shape. The conveyance apparatus 1 includes a main traveling body 2 capable of traveling in a Y direction (front/rear depth direction) on a horizontal plane and a secondary traveling body 3 supported above the main traveling body 2 in a manner enabling travel in a horizontally oriented X direction (right/left width direction) at a right angle to the travel direction of the main traveling body 2. A rectangular frame structure 4, surrounding the storage area, is horizontally installed over the storage area at a fixed height above the floor surface via column members 5, and respective end portions of the main traveling body 2 are supported, in a manner enabling traveling in the Y direction, on a set of beam members 4a and 4b of the rectangular frame structure 4 that are parallel to the Y direction. The main traveling body 2 has a pair of side frames 2a and 2b, with a length spanning an entire length in the X direction, aligned in parallel across a suitable interval in its travel direction (Y direction), and respective side edges of the secondary traveling body 3 are supported, in a manner enabling traveling in the X direction, on the respective side frames 2a and 2b.

A storage conveyor 6 and a retrieval conveyor 7 are juxtaposed to the storage area. Transferring end portions 6a and 7a at the storage area sides of the respective conveyors 6 and 7 enter inside the storage area, and by Y-direction traveling of the main traveling body 2 on the beam members 4a and 4b of the rectangular frame structure 4 and X-direction traveling of the secondary traveling body 3 on the side frames 2a and 2b of the main traveling body 2, the secondary traveling body 3 can be positioned directly above any position of an entire area inside the storage area surrounded by the rectangular frame structure 4, including the transferring end portions 6a and 7a of the storage and retrieval conveyors 6 and 7.

As shown in FIG. 4 and FIG. 5, the main travel body 2 has carriage portions 8a and 8b supported on the beam members 4a and 4b in a manner enabling movement in a length direction of the beam members 4a and 4b, the pair of side frames 2a and 2b are supported on the carriage portions 8a and 8b, and each of the carriage portions 8a and 8b is provided with a plurality of wheels 9 that roll on the corresponding beam member 4a or 4b and positioning rollers 10 sandwiching the beam member 4a or 4b from both right and left sides. At the respective beam members 4a and 4b, timing belts 11a and 11b are stretched in a manner enabling rotation along the beam members 4a and 4b, each of the timing belts 11a and 11b has both ends thereof fastened to the corresponding carriage portion 8a or 8b, and with each of the timing belts 11a and 11b, one of pulleys that stretch it is interlockingly coupled to a single motor 13 via a transmission shaft 12 to provide a configuration where both timing belts 11a and 11b are driven to rotate in synchronization by the motor 13 to move the main traveling body 2 reciprocally in parallel to the Y direction.

At the side frame 2a at one side of the main traveling body 2, a timing belt 14 is stretched in a manner enabling rotation along the side frame 2a and a motor 15 that drives the timing belt 14 to rotate is juxtaposed. As shown in FIG. 6 and FIG. 7, the secondary travel body 3 is configured from a pair of side frames 3a and 3b, disposed in parallel to the side frames 2a and 2b of the main traveling body 2 at an upper side of the side frames 2a and 2b, and a pair of coupling frames 3c and 3d, coupling and integrating both side frames 3a and 3b to each other, a plurality of wheels 16, rolling on the side frames 2a and 2b of the main traveling body 2, are pivotally supported at the side frames 3a and 3b, and bearing plates 18a and 18b, each pivotally supporting a pair of rollers 17 that sandwich the side frame 2a of the main traveling body 2, are attached at positions near respective ends of the side frame 3a at one side. Respective ends of the timing belts 14 are fastened to the bearing plates 18a and 18b and by driving the timing belt 14 to rotate by means of the motor 15, the secondary traveling body 3 can be moved reciprocally in the X direction.

With the above configuration, by a combination of putting the motor 13 in operation to move the main traveling body 2 in the Y direction and putting the motor 15, on the main traveling body 2, in operation to move the secondary traveling body 3 in the X direction on the main traveling body 2, the secondary traveling body 3 can be positioned directly above any position of the storage area of rectangular planar shape surrounded by the rectangular frame structure 4.

Figure 8:
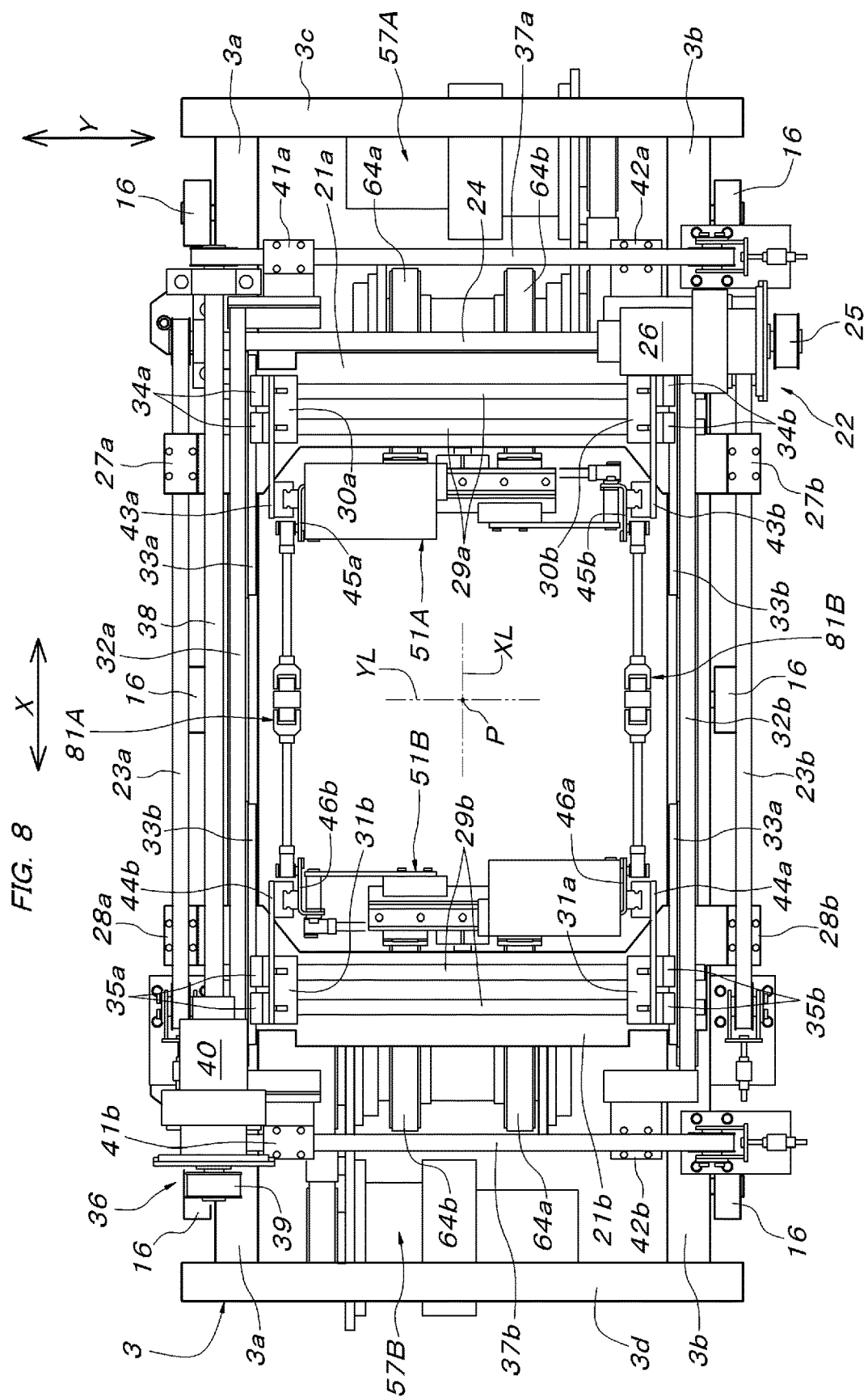
FIG. 8 is a plan view showing a detailed structure on the secondary traveling body.
Figure 9:
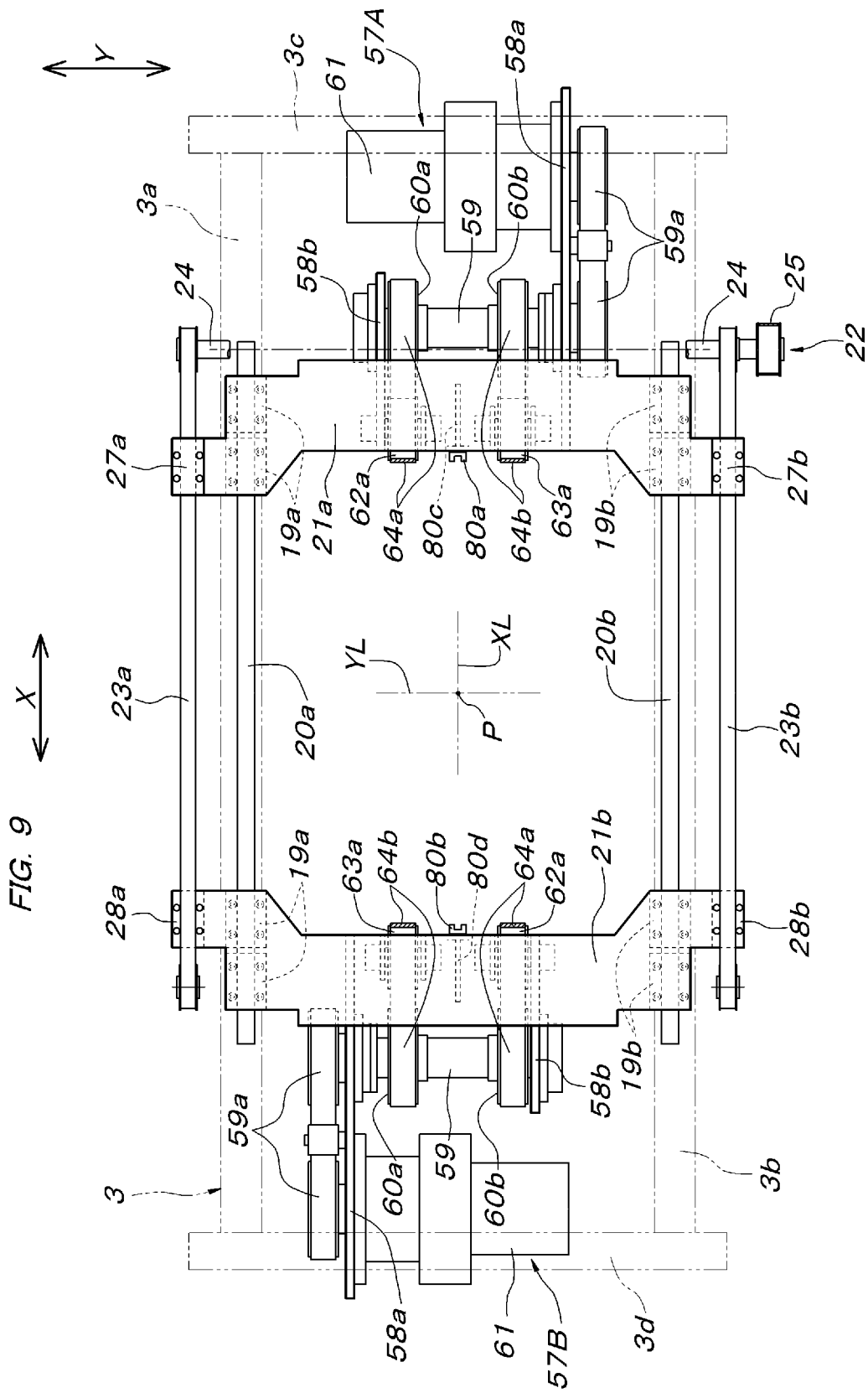
FIG. 9 is a plan view showing an X-direction pair of main movable bases supported on the secondary traveling body.
Figure 10:
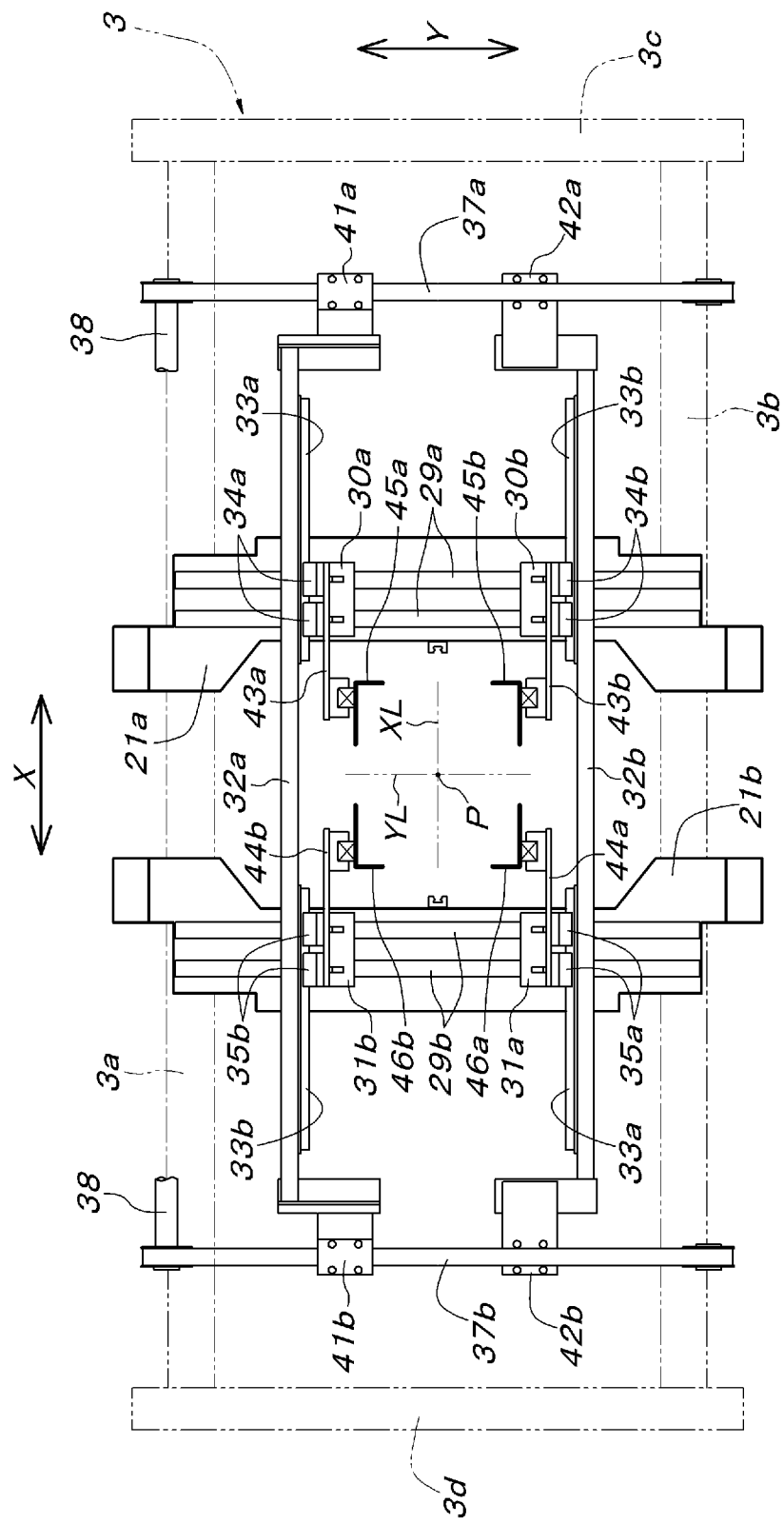
FIG. 10 is a plan view showing the X-direction pair of main movable bases with a Y-direction pair of secondary movable bases supported on each of the main movable bases.

As shown in FIG. 8 to FIG. 10, the secondary traveling body 3 has a pair of main movable bases 21a and 21b, made capable of moving closer to and away from each other in the X direction, installed via guide rails 20a and 20b attached on the side frames 3a and 3b and slide blocks 19a and 19b fitted to the guide rails 20a and 20b and has juxtaposed thereto an X-direction drive means 22 for moving the pair of main movable bases 21a and 21b closer to and away from each other in synchronization in the X direction. The X-direction drive means 22 is configured from a pair of timing belts 23a and 23b, stretched at outer sides of the side frames 3a and 3b of the secondary traveling body 3 in a manner enabling rotation along the side frames 3a and 3b, and a motor 26, interlockingly coupled to both timing belts 23a and 23b via a transmission shaft 24 and a belt transmission means 25 and installed on the secondary traveling body 3, and upper-side path portions of the respective timing belts 23a and 23b are coupled via coupling members 27a and 27b to respective ends of one main movable base 21a and lower-side path portions of the respective timing belts 23a and 23b are coupled via coupling members 28a and 28b to respective ends of the other main movable base 21b. With the thus configured X-direction drive means 22, the pair of main movable bases 21a and 21 b can be moved closer to each other by driving both timing belts 23a and 23b to rotate forward by the motor 26 and the pair of main movable bases 21a and 21b can be moved away from each other by driving both timing belts 23a and 23b to rotate in reverse by the motor 26.

Figure 11A:
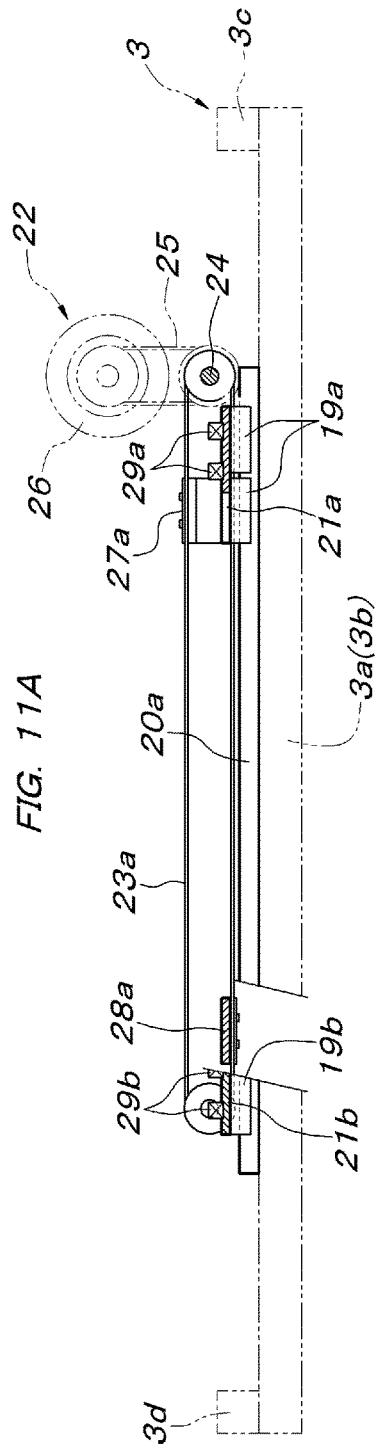
FIG. 11A is a partially cutaway front view showing an X-direction drive means driving the main movable bases.
Figure 11B:
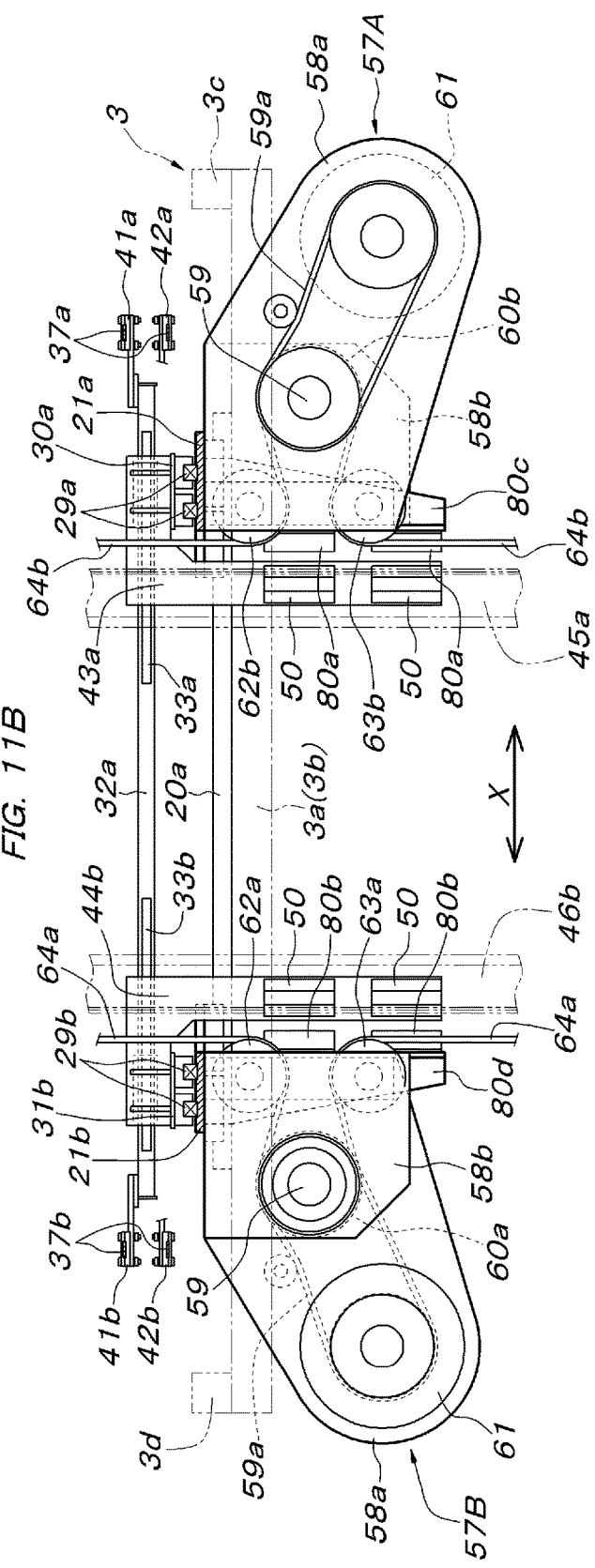
FIG. 11B is a front view showing raising/lowering drive means provided at the main movable bases.
Figure 12:
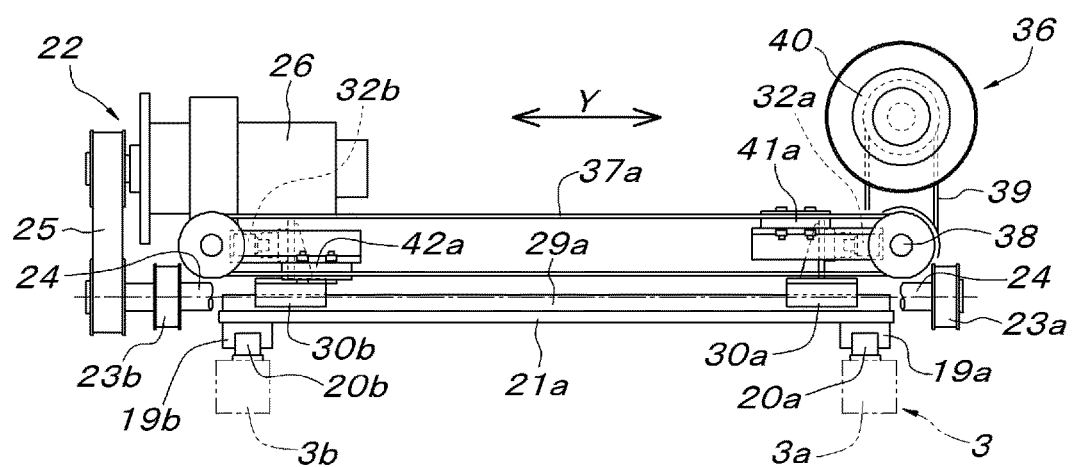
FIG. 12 is a side view showing a Y-direction drive means driving the secondary movable bases.
Figure 13:
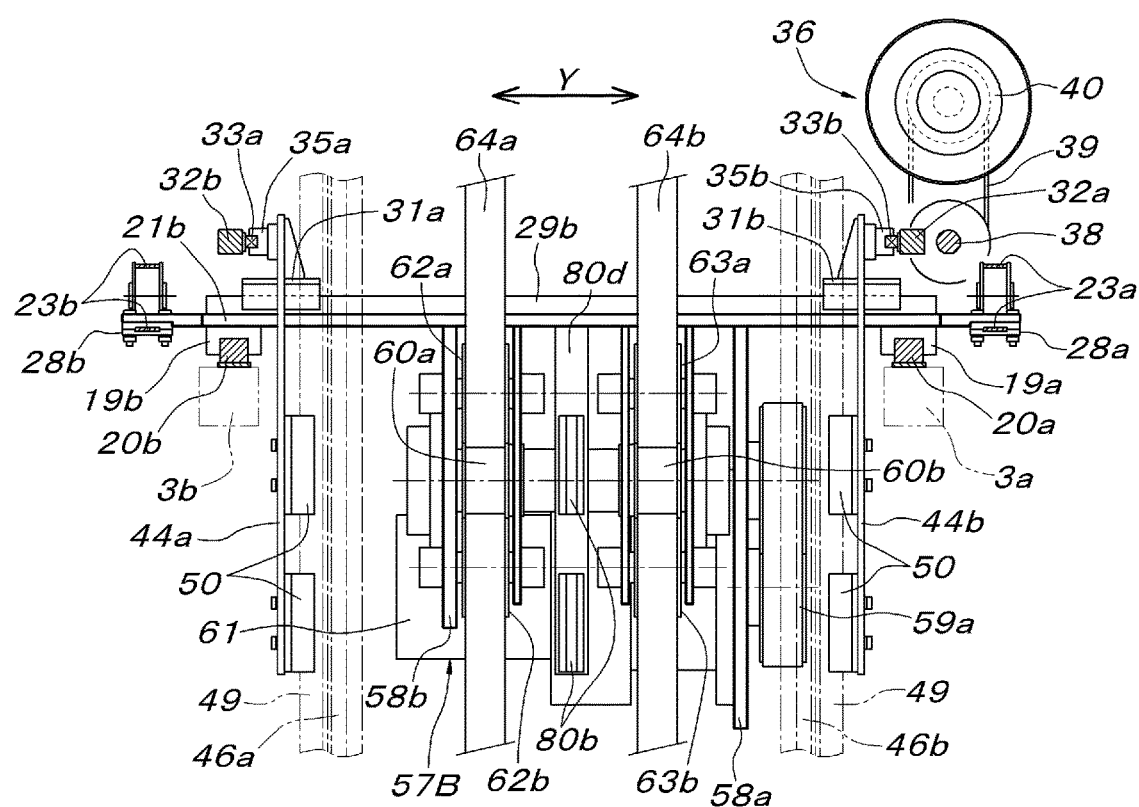
FIG. 13 is a side view showing the secondary movable bases and the raising/lowering drive means supported at the main movable base at one side.

As shown in FIG. 10 to FIG. 12, on each of the pair of main movable bases 21a and 21b, a pair of secondary movable bases 30a and 30b or 31a and 31 b, which are movable in the Y direction, are provided via a guide rail 29a or 29b laid in parallel to the Y direction on the main movable base 21a or 21b. Among the secondary movable bases 30a to 31 b, the X-direction pair of secondary movable bases 30a and 31 b that are positioned at the same side in the Y direction are supported in a manner enabling movement in the X direction on an interlocking rod-shaped body 32a, disposed in parallel to the X direction at an outer side of the secondary movable bases 30a and 31 b, via guide rail 33a, laid at the interlocking rod-shaped body 32a, and slide blocks 34a and 35a fitted to the guide rail 33a, and the other X-direction pair of secondary movable bases 30b and 31a are supported in a manner enabling movement in the X direction on an interlocking rod-shaped body 32b, disposed in parallel to the X direction at an outer side of the secondary movable bases 30b and 31a, via guide rail 33b, laid at the interlocking rod-shaped body 32b, and slide blocks 34b and 35b fitted to the guide rail 33b.

The pair of interlocking rod-shaped bodies 32a and 32b are moved closer to and away from each other in the Y direction by a Y-direction drive means 36. The Y-direction drive means 36 is configured from a pair of timing belts 37a and 37b, stretched in parallel to the secondary traveling body 3 and the Y direction at outer sides of the pair of interlocking rod-shaped bodies 32a and 32b, and a motor 40 driving both timing belts 37a and 37b to rotate via a transmission shaft 38 and a belt transmission means 39 and installed on the secondary traveling body 3. Upper-side path portions of the timing belts 37a and 37b are coupled via coupling members 41a and 41b to respective ends of one coupling rod-shaped body 32a and lower-side path portions of the respective timing belts 37a and 37b are coupled via coupling members 42a and 42b to respective ends of the other interlocking rod-shaped body 32b. With the thus configured Y-direction drive means 36, the pair of interlocking rod-shaped bodies 32a and 32b can be moved closer to each other in the Y direction by driving both timing belts 37a and 37b to rotate forward by the motor 40 and the pair of interlocking rod-shaped bodies 32a and 32b can be moved away from each other in the Y direction by driving both timing belts 37a and 37b to rotate in reverse by the motor 40. When the pair of interlocking rod-shaped bodies 32a and 32b move closer to each other, the Y-direction pair of secondary movable bases 30a and 30b supported on the main movable base 21a move closer to each other and, at the same time, the Y-direction pair of secondary movable bases 31a and 31b supported on the main movable base 21b move closer to each other. Oppositely, when the pair of interlocking rod-shaped bodies 32a and 32b move away from each other, the Y-direction pair of secondary movable bases 30a and 30b supported on the main movable base 21a move away from each other and, at the same time, the Y-direction pair of secondary movable bases 31a and 31b supported on the main movable base 21b move away from each other. In either case, an interval between the X-direction pair of secondary movable bases 30a and 31 b that are interlocked with the interlocking rod-shaped body 32a and an interval between the X-direction pair of secondary movable bases 30b and 31a that are interlocked with the interlocking rod-shaped body 32b are respectively maintained in a state of being equal to an interval between the main movable bases 21a and 21b.

Figure 23:
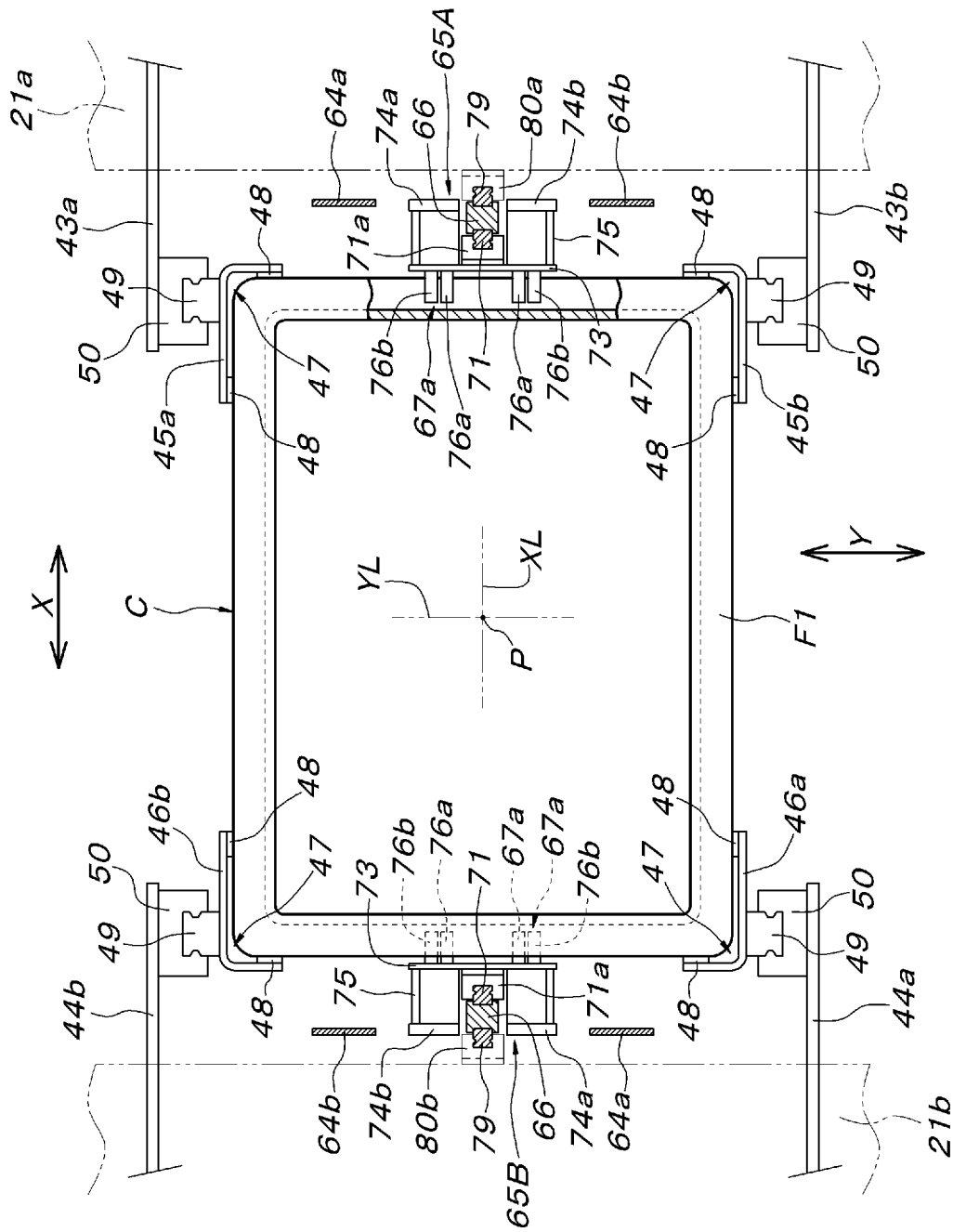
FIG. 23 is a partial transverse sectional plan view showing a state where a container is gripped and raised/lowered by the four gripping raising/lowering bodies and the X-direction pair of lifting raising/lowering bodies.

As shown in FIG. 10 and FIG. 11B, supporting members 43a, 43b, 44a, and 44b of inverted-L-shapes extending downward at X-direction inner sides are respectively mounted to the four secondary movable bases 30a, 30b, 31 a, and 31b, and gripping raising/lowering bodies 45a to 46b are respectively mounted to inner sides of vertical portions of the respective supporting members 43a to 44b. Each of the gripping raising/lowering bodies 45a to 46b is constituted of a rod-shaped member that is long in a vertical direction and includes a fitting portion 47 having an angle-shaped transverse section over an entire vertical direction length. As shown in FIG. 23, the fitting portions 47 are disposed in orientations enabling fitting respectively to four corners of a container C to be conveyed, and have anti-slip strip bodies 48 attached, so as to extend continuously over the entire length, to outer side edges of right-angled inner side surfaces facing the container C. For each of the gripping raising/lowering bodies 45a to 46b, a raising/lowering guide rail 49, which is continuous over an entire length, is attached to an outer side of an X-direction plate portion parallel to the X direction, and slide blocks 50, fitted to the raising/lowering guide rails 49 and supporting the respective gripping raising/lowering bodies 45a to 46b so as to be capable of being raised and lowered, are attached to the inner sides of the vertical portions of the respective supporting members 43a to 44b.

Figure 14:
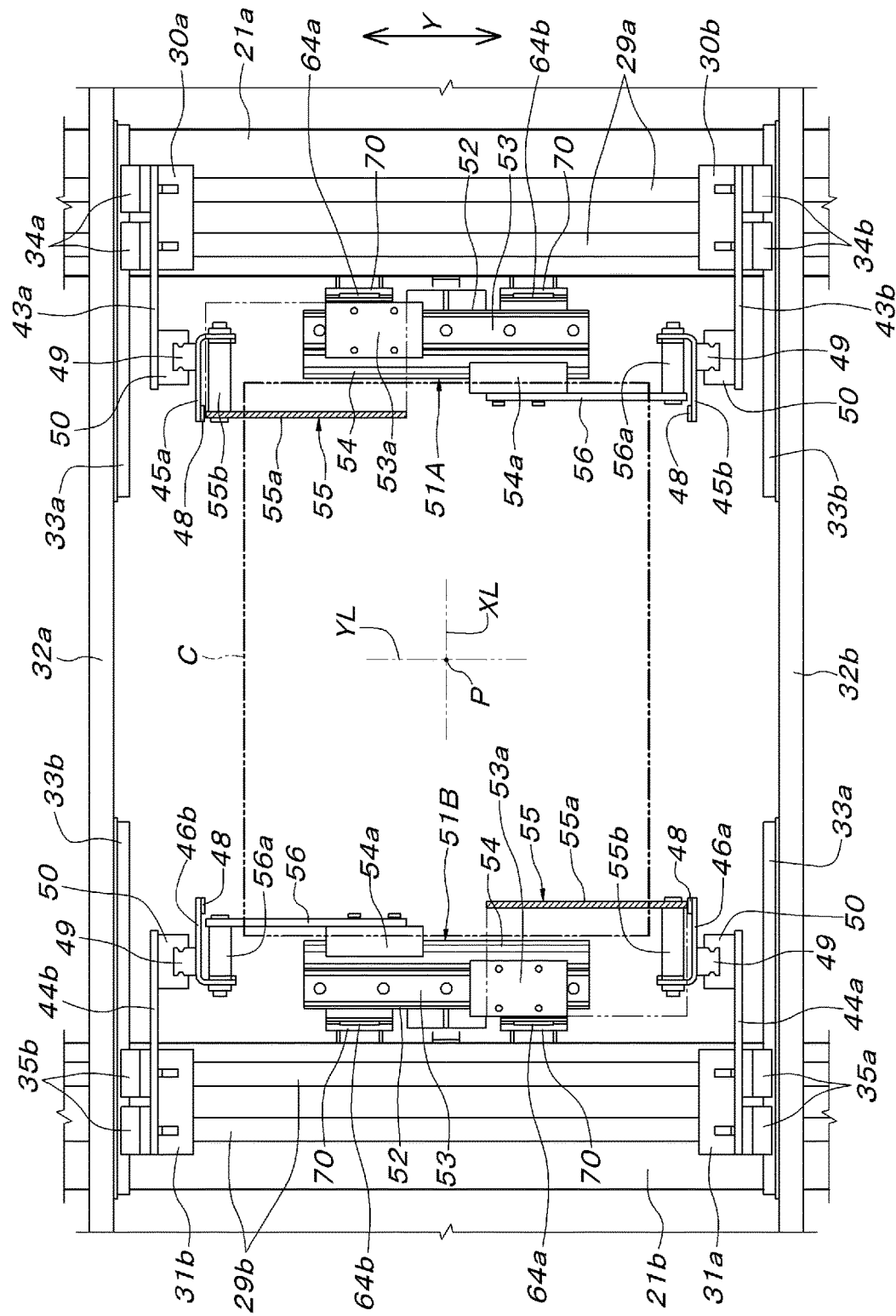
FIG. 14 is a plan view showing a support structure of four gripping raising/lowering bodies.
Figure 18:
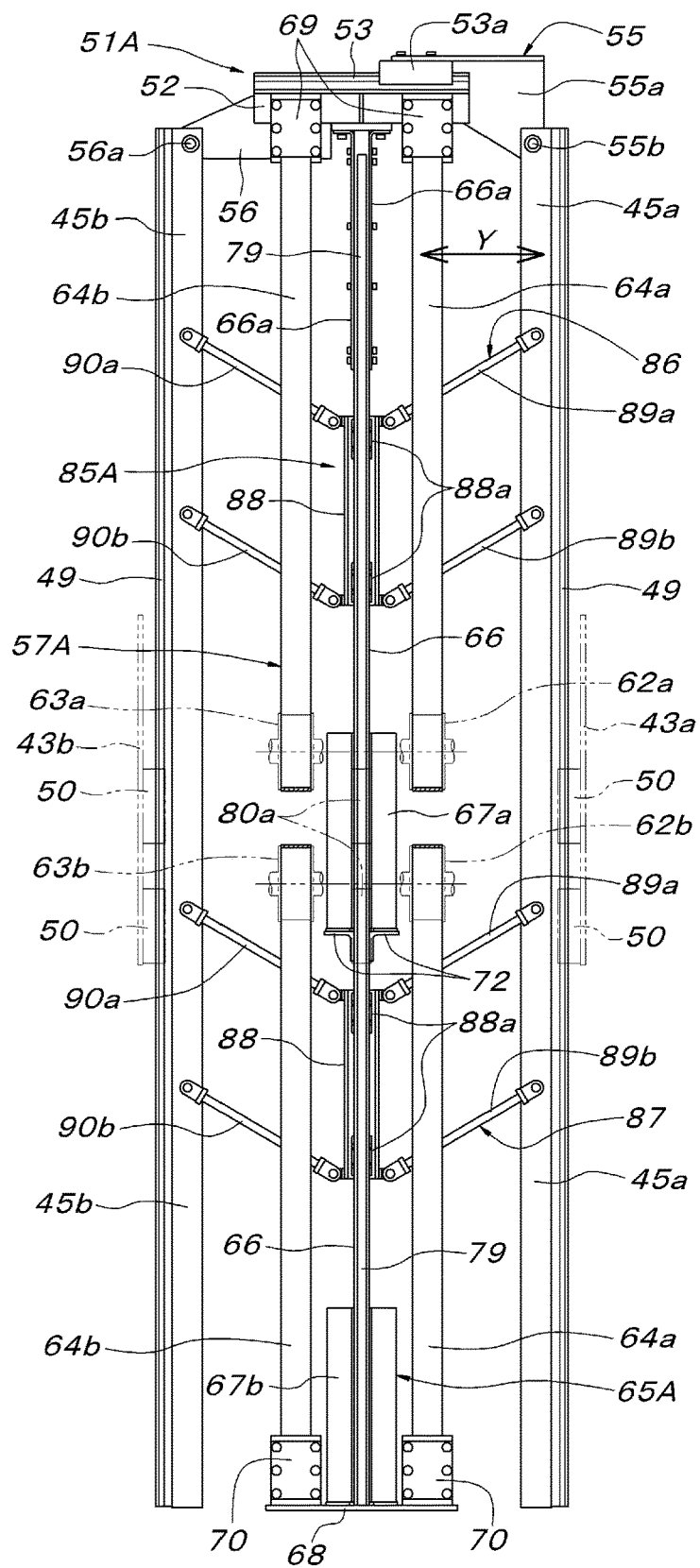
FIG. 18 is a side view showing a Y-direction pair of gripping raising/lowering bodies in a state of being separated furthest and a lifting raising/lowering body at an intermediate position thereof.
Figure 19:
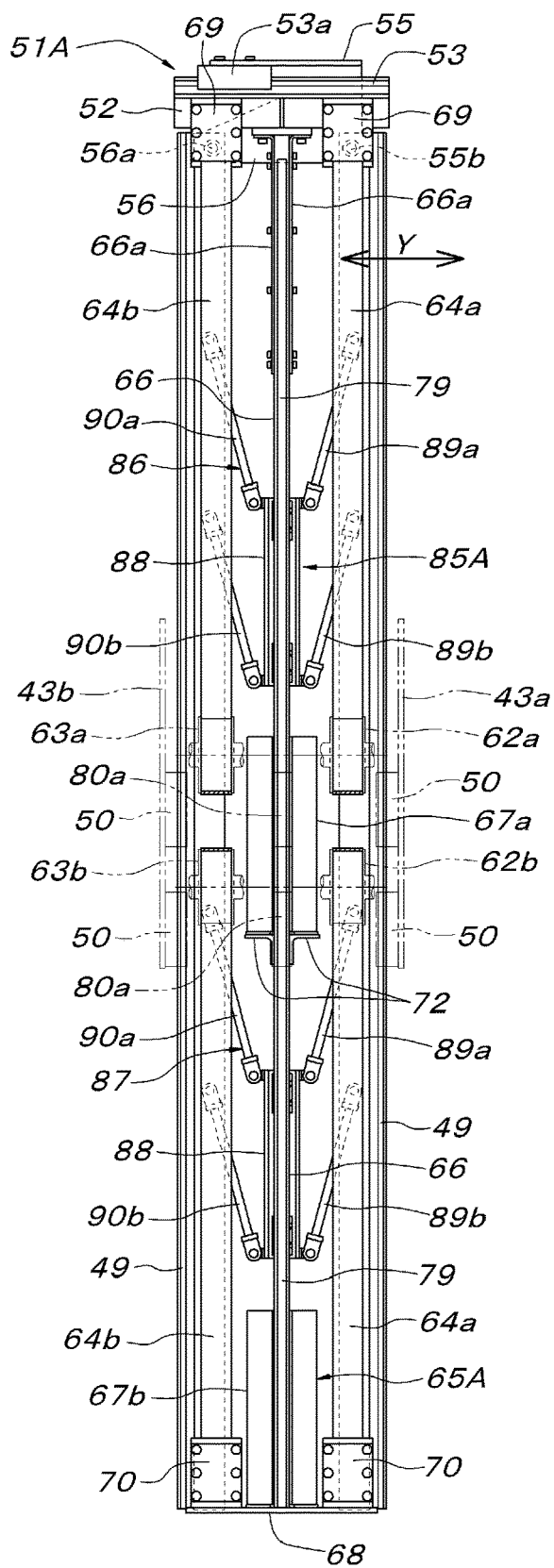
FIG. 19 is a side view showing the Y-direction pair of gripping raising/lowering bodies in a state of being brought closest together and the lifting raising/lowering body at the intermediate position thereof.

As shown in FIG. 14 and FIG. 18, upper end portions of the gripping raising/lowering bodies 45a and 45b that are aligned in parallel in the Y direction are coupled by a coupling means 51A in a manner enabling moving close to and away from each other in the Y direction, and upper end portions of the gripping raising/lowering bodies 46a and 46b that are aligned in parallel in the Y direction are coupled by a coupling means 51B in a manner enabling moving close to and away from each other in the Y direction. The two coupling means 51A and 51B are of mutually point symmetrical structure in a planar view, slide guide rails 53 and 54 are attached in parallel to the Y direction to an upper side surface and an inner side surface of each square columnar member 52 that is long in the Y direction, L-shaped support plates 55, supporting upper ends of the gripping raising/lowering bodies 45a and 46a, are mounted to slide blocks 53a fitted to the upper-side slide guide rails 53, and support plates 56, supporting upper ends of the gripping raising/lowering bodies 45b and 46b, are mounted to slide blocks 54a fitted to the inner-side slide guide rails 54.

Figure 15:
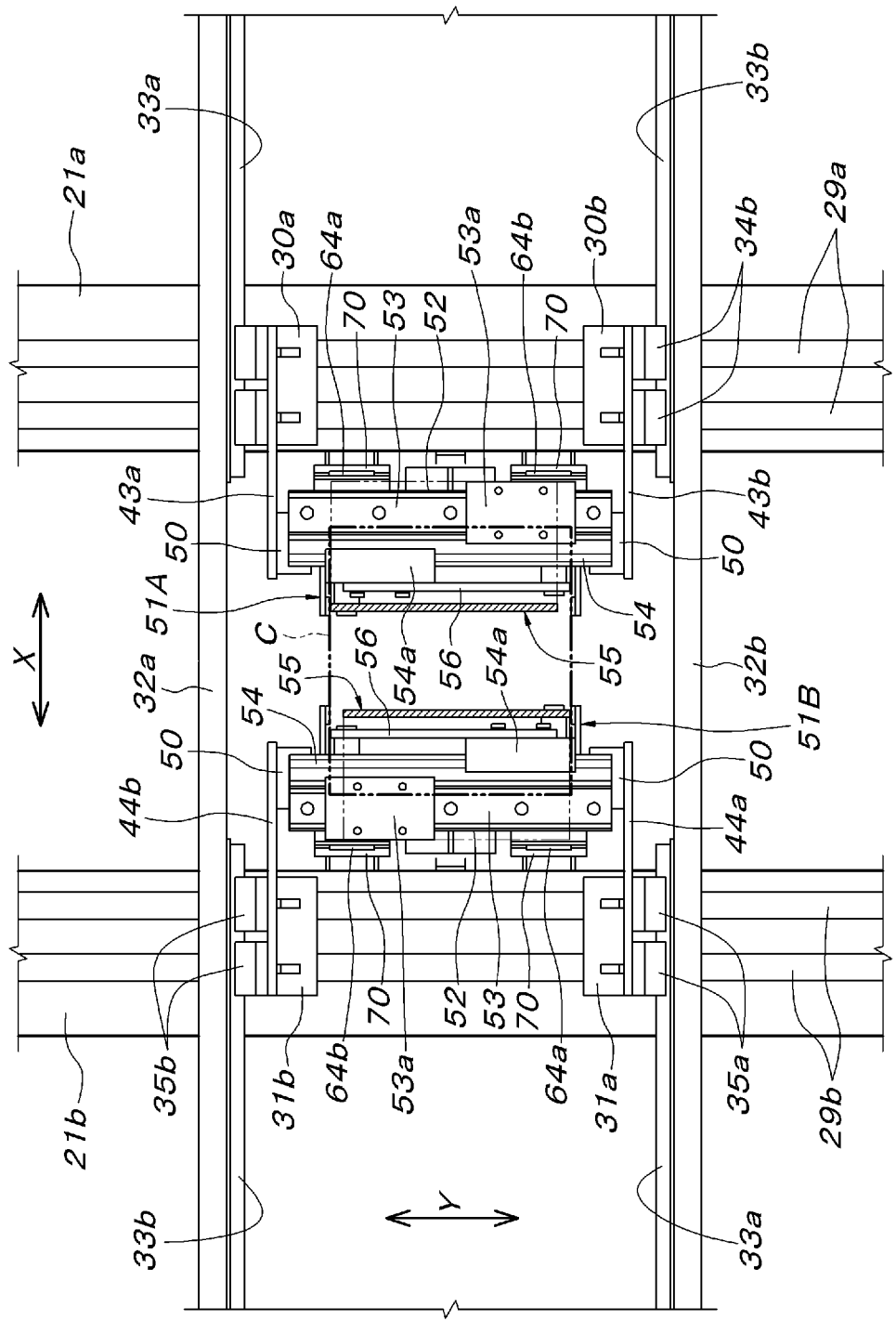
FIG. 15 is a partial transverse sectional plan view of a state where the four gripping raising/lowering bodies are brought closest to a center of a container gripping area.

The upper ends of the gripping raising/lowering bodies 45a and 46a and the L-shaped support plates 55 are coupled, at upper end inner sides of Y-direction plate portions parallel to the Y direction of the gripping raising/lowering bodies 45a and 46a and outer end portions of vertical plate portions 55a of the L-shaped support plates 55, by pivot shafts 55b parallel to the X direction that are adjacent to inner sides of the X-direction plate portions of the gripping raising/lowering bodies 45a and 46a. The upper ends of the gripping raising/lowering bodies 45b and 46b and the support plates 56 are coupled, at upper end inner sides of Y-direction plate portions of the gripping raising/lowering bodies 45b and 46b and outer end portions of the support plates 56, by pivot shafts 56a parallel to the X direction that are adjacent to inner sides of the X-direction plate portions of the gripping raising/lowering bodies 45b and 46b. A configuration is thus provided where, as shown in FIG. 15, when the Y-direction pair of gripping raising/lowering bodies 45a and 45b move closer to each other in the Y direction and the Y-direction pair of gripping raising/lowering bodies 46a and 46b move closer to each other in the Y direction, the support plates 56 supporting the gripping raising/lowering bodies 45b and 46b and the slide blocks 54a supporting these plates enter inner sides of the vertical plate portions 55a of the L-shaped support plates 55 supporting the gripping raising/lowering bodies 45a and 46a to enable the Y-direction pair of gripping raising/lowering bodies 45a and 45b to approach each other to a state of being disposed further inward than respective Y-direction ends of the square columnar member 52 in a planar view and the Y-direction pair of gripping raising/lowering bodies 46a and 46b to approach each other to a state of being disposed further inward than the respective Y-direction ends of the square columnar member 52 in a planar view.

By the above configuration, one Y-direction pair of gripping raising/lowering bodies 45a and 45b and the coupling means 51A positioned between the upper end portions thereof are made capable of being raised and lowered integrally with respect to the supporting members 43a and 43b (secondary movable bases 30a and 30b) supporting the gripping raising/lowering bodies 45a and 45b, and the other Y-direction pair of gripping raising/lowering bodies 46a and 46b and the coupling means 51B positioned between the upper end portions thereof are made capable of being raised and lowered integrally with respect to the supporting members 44a and 44b (secondary movable bases 31a and 31b) supporting the gripping raising/lowering bodies 46a and 46b.

As shown in FIG. 9, a raising/lowering drive means 57A that drives the raising and lowering of the gripping raising/lowering bodies 45a and 45b and the coupling means 51A is mounted to a lower side central portion of the main movable base 21a, and a raising/lowering drive means 57B that drives the raising and lowering of the gripping raising/lowering bodies 46a and 46b and the coupling means 51B is mounted to a lower side central portion of the main movable base 21b. The two raising/lowering drive means 57A and 57B are of mutually point symmetrical structure in the planar view shown in FIG. 9, and as shown in FIG. 9, FIG. 11B, FIG. 13, and FIG. 14, each includes a Y-direction pair of a main support plate 58a and a secondary support plate 58b, a Y-direction pair of drive pulleys 60a and 60b that are pivotally supported by a common drive shaft 59 between both main and secondary support plates 58a and 58b, a brake-equipped motor 61 supported by the main support plate 58a and interlockingly coupled to the drive pulleys 60a and 60b via the common drive shaft 59 and a transmission belt 59a, a pair of upper and lower guide pulleys 62a and 62b pivotally supported by each of the secondary support plate 58b and positioned above and below an inner side of the drive pulley 60a, a pair of upper and lower guide pulleys 63a and 63b pivotally supported by the main support plate 58a and positioned above and below an inner side of the drive pulley 60b, and a Y-direction pair of raising/lowering driving timing belts 64a and 64b.

As shown in FIG. 23, a lifting raising/lowering body 65A is provided between the gripping raising/lowering bodies 45a and 45b that are aligned in parallel in the Y direction and a lifting raising/lowering body 65B is provided between the gripping raising/lowering bodies 46a and 46b that are aligned in the Y direction. The respective lifting raising/lowering bodies 65A and 65B are of mutually symmetrical structure in the X direction, and as shown in FIG. 18, each is constituted from a vertical rod-shaped main body 66 having a length substantially equivalent to that of the gripping raising/lowering bodies 45a to 46b and two upper- and lower-stage support units 67a and 67b mounted to the vertical rod-shaped main body 66. The vertical rod-shaped main body 66 has its upper end portion coupled via mounting plates 66a to a center position of Y-direction length of the square columnar member 52 of the corresponding coupling means 51A or 51B and has a belt coupling plate 68 of flat plate shape long in the Y direction mounted in an inverted T shape to its lower end.

Figure 16:
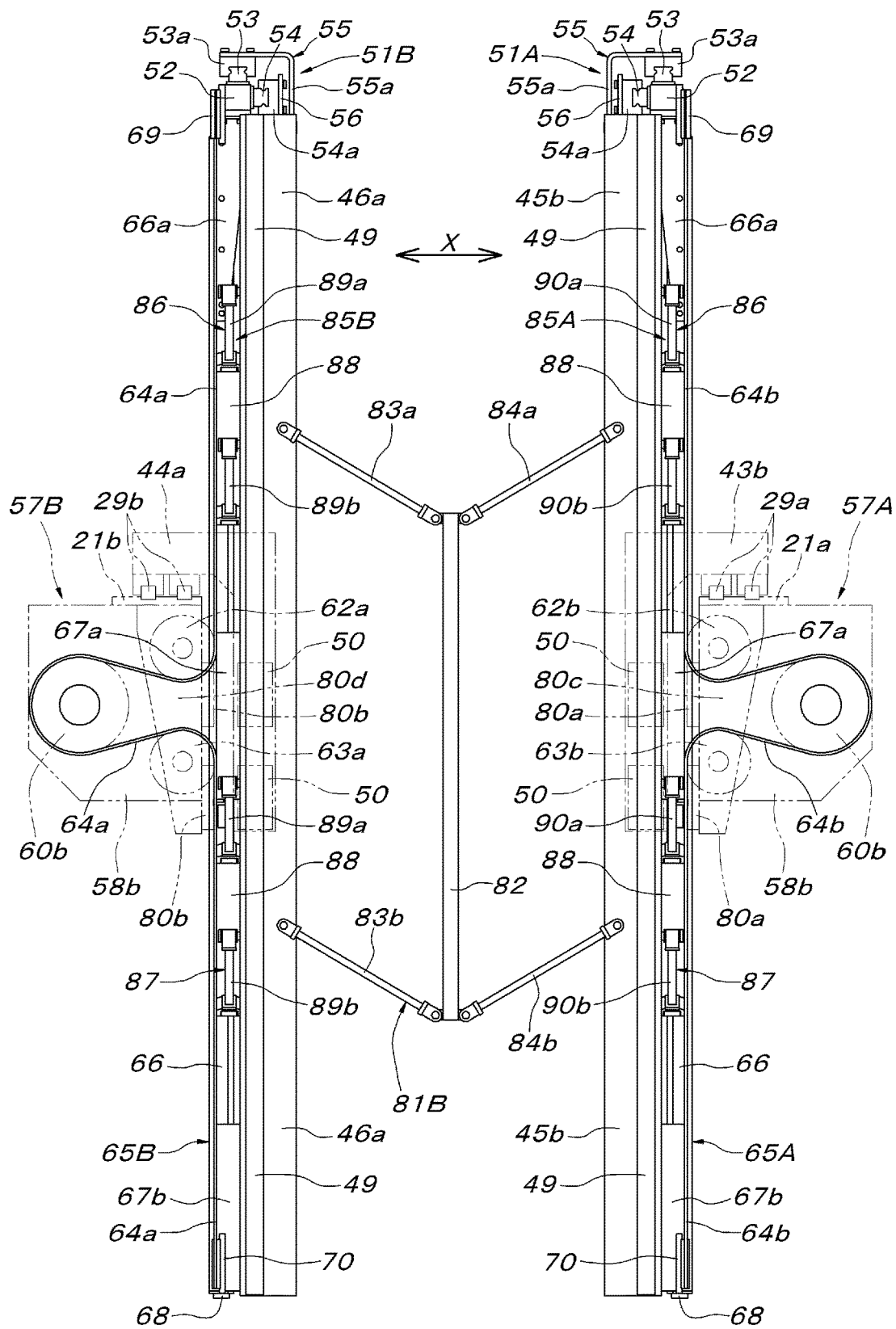
FIG. 16 is a front view showing a state where an X-direction pair of gripping raising/lowering bodies are separated furthest from each other.
Figure 17:
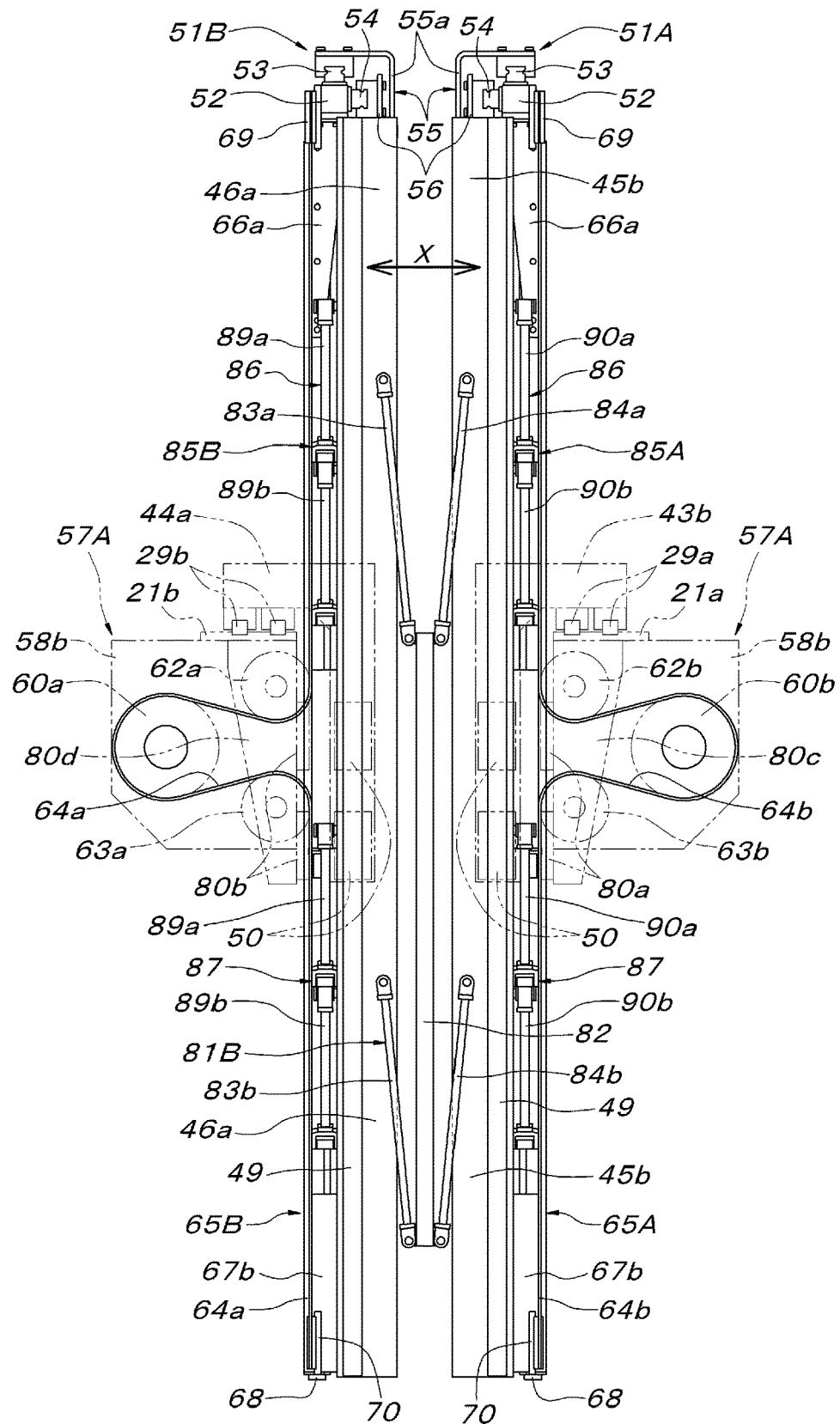
FIG. 17 is a front view showing a state where the X-direction pair of gripping raising/lowering bodies are brought closest to each other.

The raising/lowering driving timing belts 64a and 64b of each of the raising/lowering drive means 57A and 57B are positioned symmetrically at respective sides in the Y direction of the vertical rod-shaped main body 66 of the corresponding lifting raising/lowering body 65A or 65B, have one ends thereof respectively coupled via belt mounting members 69 to outer side surfaces of respective end portions of the Y direction length of the square columnar member 52, have other ends thereof respectively coupled via belt mounting members 70 to upper sides of respective end portions of Y direction length of the belt coupling plate 68, and, as shown in FIG. 16, with each of the raising/lowering drive means 57A and 57B, an intermediate portion of the raising/lowering driving timing belt 64a is wound around the drive pulley 60a via the pair of upper and lower guide pulleys 62a and 62b and an intermediate portion of the raising/lowering driving timing belt 64b is wound around the drive pulley 60b via the pair of upper and lower guide pulleys 63a and 63b. Portions of the raising/lowering driving timing belt 64a between the upper end and the guide pulley 62a and between the lower end and the guide pulley 62b and portions of the raising/lowering driving timing belt 64b between the upper end and the guide pulley 63a and between the lower end and the guide pulley 63b are stretched without looseness in parallel to the gripping raising/lowering bodies 45a to 46b (the vertical rod-shaped main bodies 66).

With the respective raising/lowering drive means 57A and 57B configured as described above, when the brake-equipped motors 61 of both raising/lowering drive means 57A and 57B are not in operation (when the drive pulleys 60a and 60b are in a braked state), all of the gripping raising/lowering bodies 45a to 46b and the vertical rod-shaped main bodies 66 of the lifting raising/lowering bodies 65A and 65B are put in states of being locked so as to be unable to be raised or lowered and are stopped at heights at that point. When the brake-equipped motors 61 of both raising/lowering drive means 57A and 57B are put in synchronous operation to perform synchronous driving of the respective raising/lowering driving timing belts 64a and 64b in directions of pulling up the lower ends via the drive pulleys 60a and 60b, all of the gripping raising/lowering bodies 45a to 46b and the vertical rod-shaped main bodies 66 of the lifting raising/lowering bodies 65A and 65B are moved upward integrally at a fixed speed against gravity, and oppositely when driving in directions of pulling down the upper ends is performed, all of the gripping raising/lowering bodies 45a to 46b and the vertical rod-shaped main bodies 66 of the lifting raising/lowering bodies 65A and 65B are moved downward integrally at a fixed speed due to gravity.

All of the support units 67a and 67b included in the lifting raising/lowering bodies 65A and 65B are of the same structure and, as shown in FIG. 18, FIG. 21, and FIG. 22, each is supported on the corresponding vertical rod-shaped main body 66 so as to be capable of being raised and lowered via a slide guide rail 71 attached to an inner side of the vertical rod-shaped main body 66 so as to be continuous over an entire length and two upper and lower slide blocks 71a fitted to the slide guide rail 71 so as to be capable of being raised and lowered, with the upper-side support unit 67a being received and retained by a pair of receiving members 72 attached at an intermediate height to the respective sides in the Y direction of the vertical rod-shaped main body 66 and the lower-side support unit 67b being received and retained by the belt coupling plate 68 at the lower end of the vertical rod-shaped main body 66.

Each of the support units 67a and 67b includes a longitudinally long hollow casing 75. The casing 75 includes a base plate 73, positioned at the inner side of the vertical rod-shaped main body 66 and being of width such that it juts out to both sides in the Y direction of the vertical rod-shaped main body 66, and back plates 74a and 74b, disposed at the respective sides in the Y direction of the vertical rod-shaped main body 66 at a rear side of the base plate 73, and the slide blocks 71a are mounted to the rear side of the base plate 73 and between the back plates 74a and 74b. Also, the casing 75 includes a plurality of pin-shaped supporting implements 76a and 76b supported by the base plate 73 and the back plates 74a and 74b and being extendable and retractable in the X direction with respect to the base plate 73. Each of the pin-shaped supporting implements 76a and 76b is impelled in a direction of protruding toward an inner side from the base plate 73 by an extension coil spring 78 loosely fitted to each of the pin-shaped supporting implements 76a and 76b inside the casing 75 and between the back plate 74a or 74b and a flange portion 77 possessed by each of the pin-shaped supporting implements 76a and 76b, and the flange portion 77 is thereby held at a protrusion limit position of contacting the base plate 73. With the respective pin-shaped supporting implements 76a and 76b, pairs of pin-shaped supporting implements 76a disposed across a narrow interval and symmetrically in the Y direction with respect to a vertical direction center line (center line between the two gripping raising/lowering bodies 45a and 45b or 46a and 46b aligned in parallel in the Y direction) of the vertical rod-shaped main body 66 when viewed from the X direction and pairs of pin-shaped supporting implements 76b disposed across a broad interval and symmetrically in the Y direction with respect to the center line are aligned alternately at vertical direction intervals such that the respective pin-shaped supporting implements 76a and 76b overlap mutually partially in the vertical direction when viewed from the Y direction.

The vertical rod-shaped main body 66 of each of the lifting raising/lowering bodies 65A and 65B has a slide guide rail 79 attached, so as to be continuous over an entire length, to an outer side opposite the inner side at which the support units 67a and 67b are supported, and slide blocks 80a or 80b, fitted to the slide guide rail 79 and supporting each vertical rod-shaped main body 66 so as to be capable of being raised and lowered, are mounted to an inner side edge of a vertical supporting member 80c or 80d, an upper end of which is joined to a bottom surface of the main movable base 21a or 21b. The vertical rod-shaped main body 66 of each of the lifting raising/lowering bodies 65A and 65B is thus supported by the main movable base 21a or 21 b so as to be capable of being raised and lowered just at a center position between the two gripping raising/lowering bodies 45a and 45b or 46a and 46b aligned in parallel in the Y direction, and in regard to the raising and lowering, the two gripping raising/lowering bodies 45a and 45b aligned in parallel in the Y direction and the vertical rod-shaped main body 66 of the lifting raising/lowering body 65A at an intermediate position thereof undergo raising and lowering motions integrally and the two gripping raising/lowering bodies 46a and 46b aligned in parallel in the Y direction and the vertical rod-shaped main body 66 of the lifting raising/lowering body 65B at an intermediate position thereof undergo raising and lowering motions integrally.

Figure 20A:
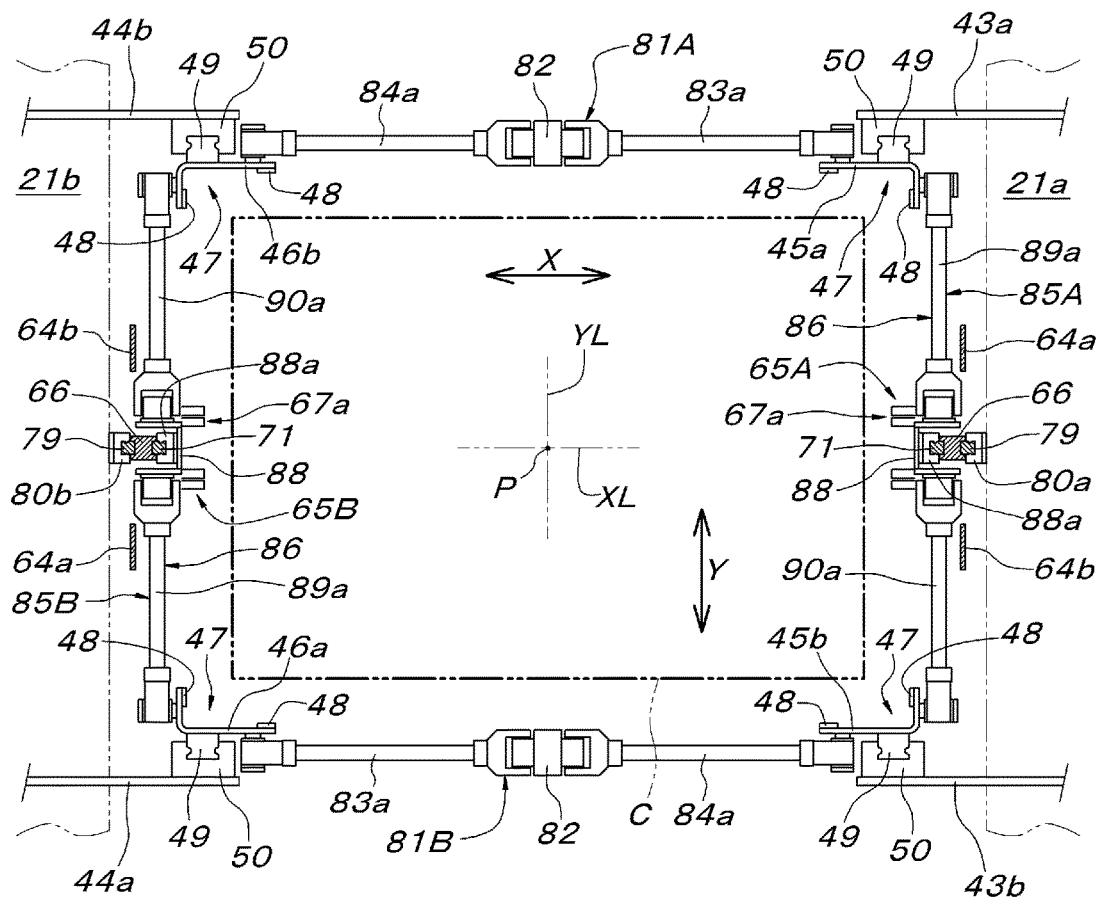
FIG. 20A is a partial transverse sectional plan view showing a state where the four gripping raising/lowering bodies and the X-direction pair of lifting raising/lowering bodies are separated furthest from each other.
Figure 20B:
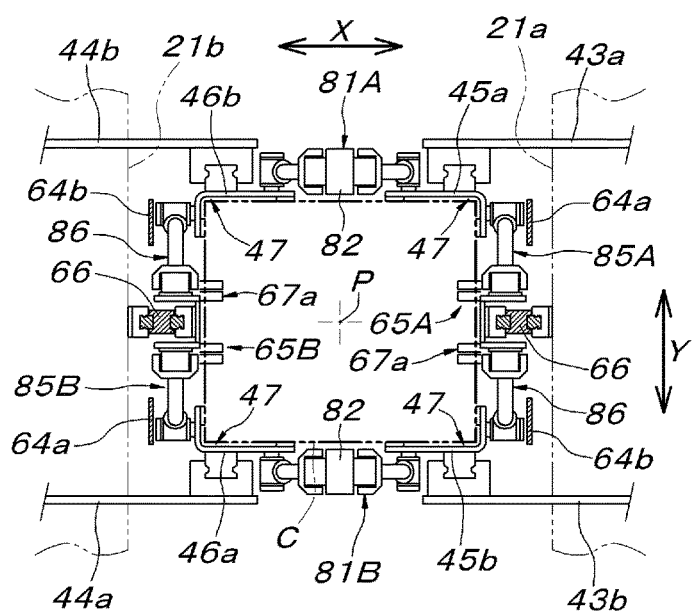
FIG. 20B is a partial transverse sectional plan view showing a state where the four gripping raising/lowering bodies and the X-direction pair of lifting raising/lowering bodies are brought closest to each other.
Figure 22A:
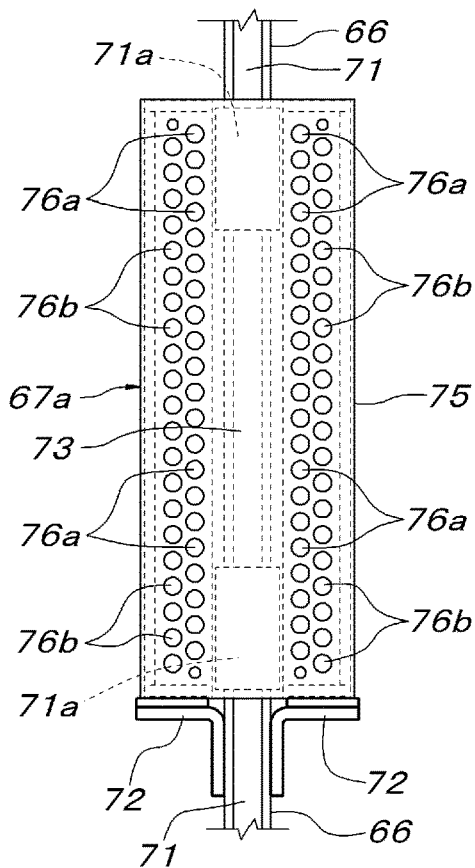
FIG. 22A is an enlarged front view showing a lower side support unit included in a lifting raising/lowering body.
Figure 22B:
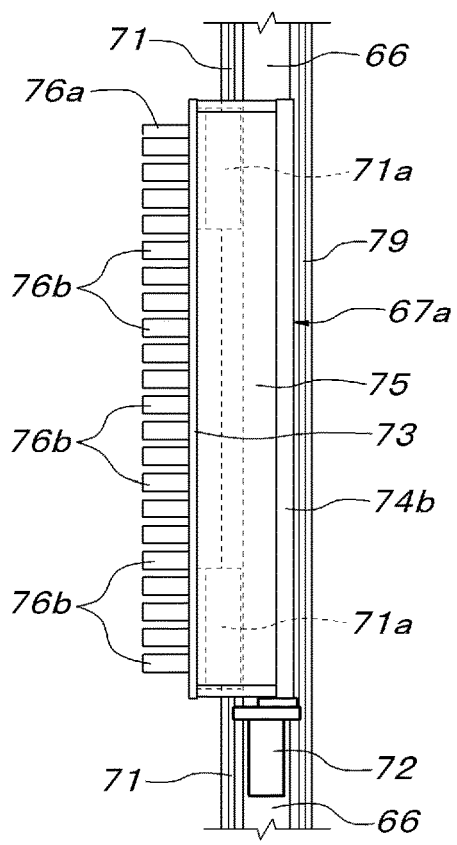
FIG. 22B is a side view of the same.
Figure 22C:
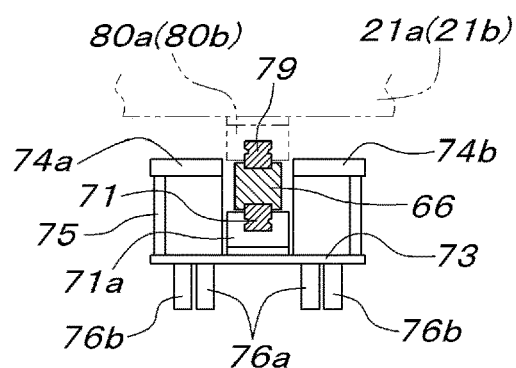
FIG. 22C is a transverse sectional plan view of the same.
Figure 22D:
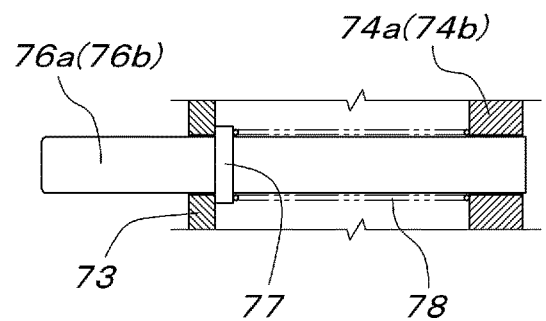
FIG. 22D is an enlarged longitudinal sectional side view of essential parts of the same.

As shown in FIG. 16 and FIG. 20, among the gripping raising/lowering bodies 45a to 46b, the two gripping raising/lowering bodies 45a and 46b aligned in parallel in the X direction have interposed therebetween a parallelogram link mechanism 81A for allowing just parallel movement of the two bodies in the X direction and the two gripping raising/lowering bodies 45b and 46a aligned in parallel in the X direction have interposed therebetween a parallelogram link mechanism 81B for allowing just parallel movement of the two bodies in the X direction. The parallelogram link mechanisms 81A and 81B are of the same structure mutually and each is constituted of a central raising/lowering link member 82, a pair of upper and lower rocking parallel links 83a and 83b that are interposed between the central raising/lowering link member 82 and the gripping raising/lowering body 45a or 46a at one side, and a pair of upper and lower rocking parallel links 84a and 84b that are interposed between the central raising/lowering link member 82 and the gripping raising/lowering body 45b or 46b at the other side. Each upper-side rocking parallel link 83a is pivotally supported at each of an upper end of the central raising/lowering link member 82 and a higher position at the outer side of the X-direction plate portion of the gripping raising/lowering body 45a or 46a, each upper-side rocking parallel link 84a is pivotally supported at each of the upper end of the central raising/lowering link member 82 and a higher position at the outer side of the X-direction plate portion of the gripping raising/lowering body 46b or 45b, each lower-side rocking parallel link 83b is pivotally supported at each of a lower end of the central raising/lowering link member 82 and the outer side of the X-direction plate portion of the gripping raising/lowering body 45a or 46a so as to be parallel to the rocking parallel link 83a positioned directly above, and each lower-side rocking parallel link 84b is pivotally supported at each of the lower end of the central raising/lowering link member 82 and the outer side of the X-direction plate portion of the gripping raising/lowering body 46b or 45b so as to be parallel to the rocking parallel link 84a positioned directly above to provide a configuration where in a situation where an interval between the two gripping raising/lowering bodies 45a and 46b aligned in parallel in the X direction and an interval between the two gripping raising/lowering bodies 45a and 46b aligned in parallel in the X direction are spread maximally, the rocking parallel links 83a to 84b are inclined obliquely upward with respect to each central raising/lowering link 82 as shown in FIG. 16.

As shown in FIG. 18 and FIG. 20, among the gripping raising/lowering bodies 45a to 46b, the two gripping raising/lowering bodies 45a and 45b aligned in parallel in the Y direction have interposed therebetween a parallelogram link mechanism 85A for allowing just parallel movement of the two bodies in the Y direction and the two gripping raising/lowering bodies 46a and 46b aligned in parallel in the Y direction have interposed therebetween a parallelogram link mechanism 85B for allowing just parallel movement of the two in the Y direction. Both parallelogram link mechanisms 85A and 85B are of the same structure mutually and each includes two upper- and lower-stage raising/lowering link units 86 and 87. Each upper-side raising/lowering link unit 86 is disposed higher than the upper-side support unit 67a at the corresponding lifting raising/lowering body 65A or 65B, and the lower-side raising/lowering link unit 87 is disposed at an intermediate position between the respective upper and lower support units 67a and 67b at the corresponding lifting raising/lowering bodies 65A or 65B.

The two upper- and lower-stage raising/lowering link units 86 and 87 are of the same structure mutually and each is constituted of a central raising/lowering link member 88, which is supported, so as to be capable of being raised and lowered, via two upper and lower slide blocks 88a by the slide guide rail 71 at the inner side of the vertical rod-shaped main body 66 of the corresponding lifting raising/lowering body 65A or 65B, a pair of upper and lower rocking parallel links 89a and 89b that are interposed between the central raising/lowering link member 88 and the gripping raising/lowering body 45a or 46a at one side, and a pair of upper and lower rocking parallel links 90a and 90b that are interposed between the central raising/lowering link member 88 and the gripping raising/lowering body 45b or 46b at the other side. Each upper-side rocking parallel link 89a is pivotally supported at each of an upper end of the central raising/lowering link member 88 and a higher position at an outer side of the Y-direction plate portion of the gripping raising/lowering body 45a or 46a, each upper-side rocking parallel link 90a is pivotally supported at each of the upper end of the central raising/lowering link member 88 and a higher position at the outer side of the Y-direction plate portion of the gripping raising/lowering body 46b or 45b, each lower-side rocking parallel link 89b is pivotally supported at each of a lower end of the central raising/lowering link member 88 and the outer side of the Y-direction plate portion of the gripping raising/lowering body 45a or 46a so as to be parallel to the rocking parallel link 89a positioned directly above, and each lower-side rocking parallel link 90b is pivotally supported at each of the lower end of the central raising/lowering link member 88 and the outer side of the Y-direction plate portion of the gripping raising/lowering body 46b or 45b so as to be parallel to the rocking parallel link 90a positioned directly above to provide a configuration where, as shown in FIG. 18, in a situation where an interval between the gripping raising/lowering bodies 45a and 45b and an interval between the gripping raising/lowering bodies 46a and 46b are spread maximally, the rocking parallel links 89a to 90b are inclined obliquely upward with respect to each central raising/lowering link 88. As a matter of course, in the situation where the interval between the gripping raising/lowering bodies 45a and 45b and the interval between the gripping raising/lowering bodies 46a and 46b are spread maximally, each central raising/lowering link member 88 is disposed at a position separated furthest upward from the support unit 67a or 67b positioned therebelow of the corresponding lifting raising/lowering 65A or 65B.

To now describe a method of use and actions, containers C are placed in an orientation where respective side edges thereof are parallel to the X direction and the Y direction in a planar view in the storage area of rectangular planar shape surrounded by the rectangular frame structure 4. In this process, spaces for raising and lowering the gripping raising/lowering bodies 45a to 46b and the lifting raising/lowering bodies 65A and 65B included in the conveyance apparatus 1 are secured between mutually adjacent containers C. Also, although it is possible to place a single container C independently inside the storage area, in most cases, a plurality of containers C of the same size in a planar view are stacked. As a matter of course, in regard to the size in a planar view, containers C of various sizes within a set range of minimum size and maximum size are handled. As shown in FIG. 20 and FIG. 23, together with container size information, stacking information, and other necessary information, position information of each container C placed inside the storage area is recorded as absolute X-Y coordinate values on the storage area of a center position P in a planar view of the container C in a recording means included in a control unit for automatic operation of the conveyance apparatus 1.

Figure 24:
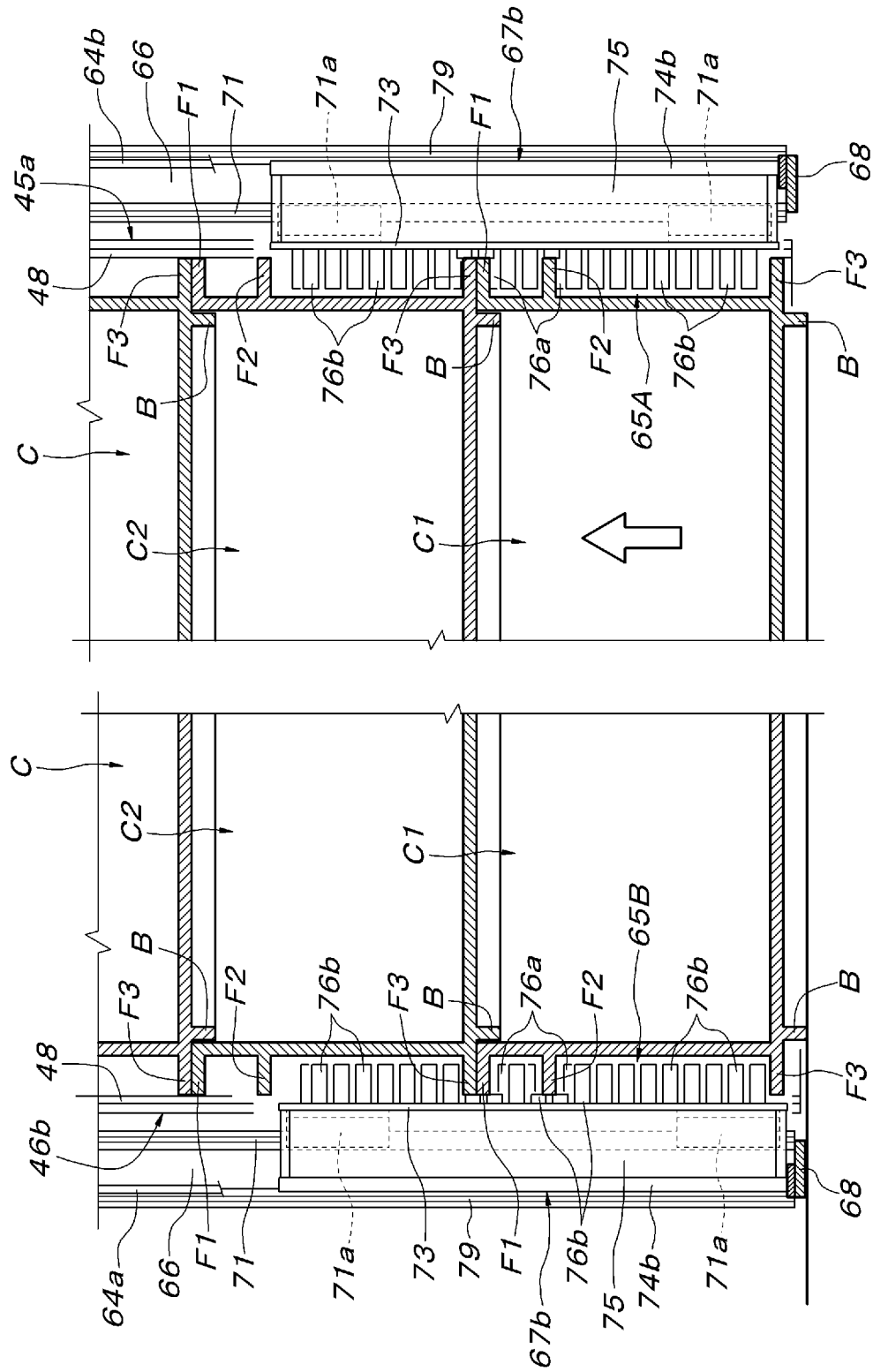
FIG. 24 is a longitudinal sectional front view for describing actions of the lifting raising/lowering bodies with respect to the container with the left half showing a state immediately before the container is lifted up and the right half showing a state immediately after the container is lifted up.
Figure 25:
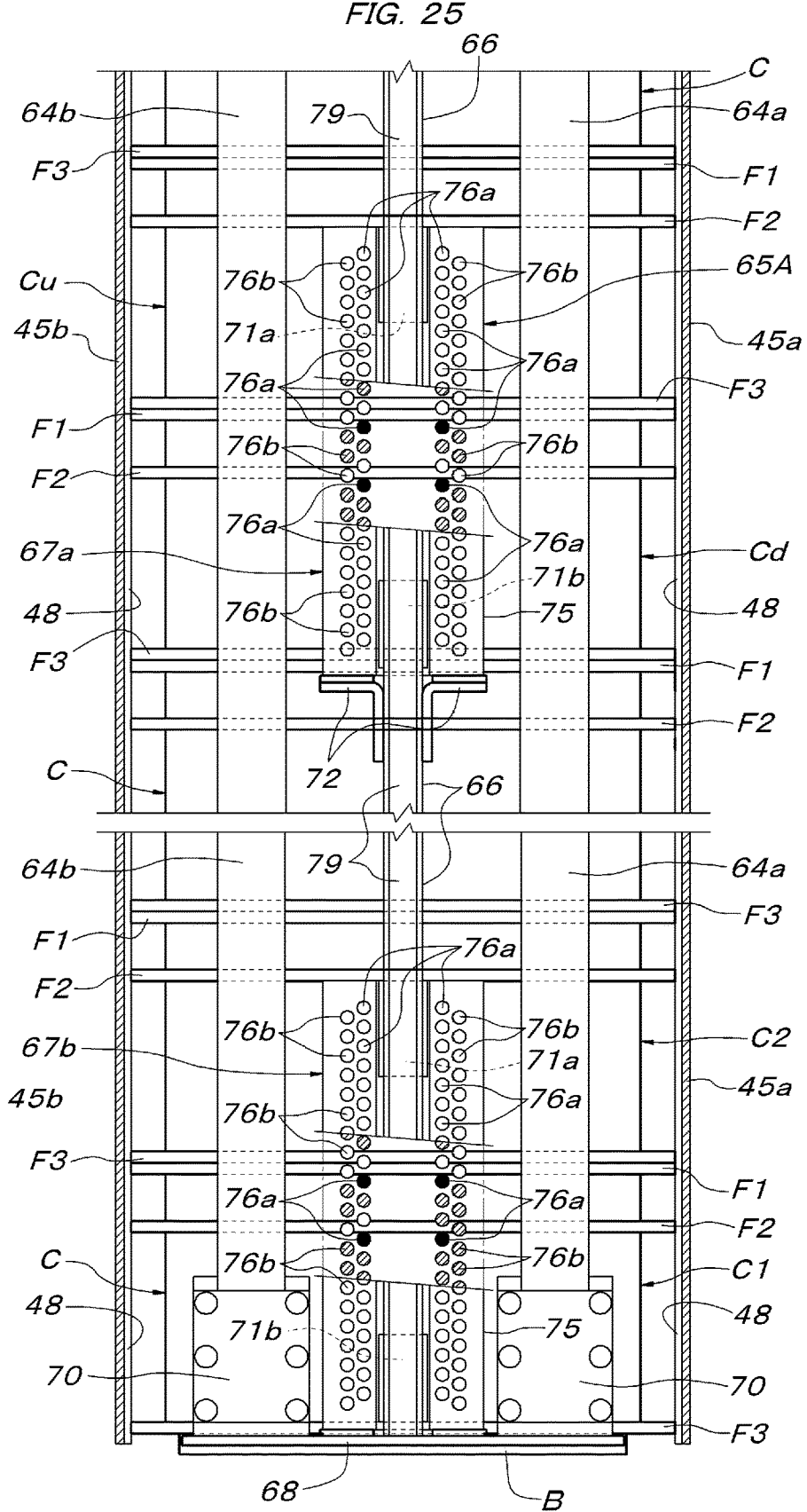
FIG. 25 is a partially cutaway, partial longitudinal sectional side view showing a state where the container is lifted and conveyed by the lifting raising/lowering bodies.

On the other hand, as shown in FIG. 23 to FIG. 25, each of all containers C handled in the present storage facility includes reinforcing flange portions F1 to F3 jutting out continuously across an entire periphery at three positions of a highest end, a position directly below the highest end, and a lowest end, and includes a leg wall portion B at a bottom surface. Therefore, when the containers C of the same planar size are stacked, a leg wall portion B of an upper-side container C fits inside an opening portion of a lower-side container C to prevent positional shifting of both the upper and lower containers C and, at the same time, the lowest end flange portion F3 of the upper-side container C overlaps onto the highest end flange portion F1 of the lower-side container C. In the present invention, the two upper and lower flange portions F1 and F2 at an upper side of each container C is utilized as protruding portions with which the pin-shaped supporting implements 76a and 76b of the respective support units 67a and 67b of the lifting raising/lowering bodies 65A and 65B engage when lifting the container C.

As shown in FIG. 14 and FIG. 20A, the gripping raising/lowering bodies 45a to 46b and the lifting raising/lowering bodies 65A and 65B included in the conveyance apparatus 1 are, in a planar view, positioned at standby home positions, located further outward than a maximum planar view size of a container C that can be handled, within a quadrilateral vertical-direction through opening portion surrounded by the X-direction pair of main movable bases 21a and 21b and the Y-direction pair of interlocking rod-shaped bodies 32a and 32b, and, in side view, put on standby at raising limit heights higher than a maximum container stacking height inside the storage area. From this state, by moving the X-direction pair of main movable bases 21a and 21b closer to each other synchronously in the X direction by putting the motor 26 of the X-direction drive means 22 into operation as described above and moving the Y-direction pair of secondary movable bases 30a and 30b and the Y-direction pair of secondary movable bases 31a and 31b on the respective main movable bases 21a and 21b closer to each other synchronously in the Y direction by putting the motor 40 of the Y-direction drive means 36 into operation, the right-angled parallelogram surrounded by the four gripping raising/lowering bodies 45a to 46b is shrunk as shown in FIG. 10, and oppositely by moving the X-direction pair of main movable bases 21a and 21 b away from each other synchronously in the X direction and moving the Y-direction pair of secondary movable bases 30a and 30b and the Y-direction pair of secondary movable bases 31a and 31b away from each other synchronously in the Y direction, the gripping raising/lowering bodies 45a to 46b and the lifting raising/lowering bodies 65A and 65B are returned to the standby home positions shown in FIG. 20A. The lifting raising/lowering bodies 65A and 65B are always positioned at the respective center positions between the Y-direction pair of gripping raising/lowering bodies 45a and 45b and between the Y-direction pair of gripping raising/lowering bodies 46a and 46b.

That is, the X-direction drive means 22 moves the four gripping raising/lowering bodies 45a to 46b, mutually symmetrically and in synchronization, closer to and away from a Y-direction center line YL, among an X-direction center line XL and the Y-direction center line YL passing through the center position of the right-angled parallelogram surrounded by the four gripping raising/lowering bodies 45a to 46b and parallel to respective side edges of the right-angled parallelogram, the Y-direction drive means 36 moves the four gripping raising/lowering bodies 45a to 46b, mutually symmetrically and in synchronization, closer to and away from the X-direction center line XL, and a configuration is thus provided where the four gripping raising/lowering bodies 45a to 46b can be moved horizontally in synchronization by both the X- and Y-direction drive means 22 and 36 so as to enlarge or shrink the right-angled parallelogram surrounded by the four gripping raising/lowering bodies 45a to 46b without changing the center position and the orientation of the right-angled parallelogram.

To retrieve a container C placed and stored at a specific position inside the storage area, automatic operation of the conveyance apparatus 1 is performed in accordance with the position information of the container C to be retrieved to laterally move the main traveling body 2 in the Y direction and laterally move the secondary traveling body 3 on the main traveling body 2 in the X direction so that a center of the right-angled parallelogram surrounded by the gripping raising/lowering bodies 45a to 46b, on standby at the standby home positions on the secondary traveling body 3, is moved to a position (retrieval operation starting position) at which it matches the center position P of the container C to be retrieved in a planar view. When the gripping raising/lowering bodies 45a to 46b, on standby at the standby home positions, have been positioned at the retrieval operation starting position, which is a prescribed position directly above the container C to be retrieved, both the X- and Y-direction drive means 22 and 36 are put in operation to move the respective gripping raising/lowering bodies 45a to 46b closer to each other in synchronization to positions (lowering starting positions) corresponding to respective corners of a right-angled parallelogram that is larger by just prescribed dimensions than a planar size of the container C to be retrieved. The present process of moving the gripping raising/lowering bodies 45a to 46b, on standby at the standby home positions, closer to each other in synchronization to the lowering starting positions may be performed overlappingly with the process of moving the gripping raising/lowering bodies 45a to 46b, on standby at the standby home positions on the secondary traveling body 3, in both the X and Y directions to the retrieval operation starting position.

When, at the retrieval operation starting position, the gripping raising/lowering bodies 45a to 46b have been moved to the lowering starting positions, the raising/lowering drive means 57A and 57B are put in operation to move the gripping raising/lowering bodies 45a to 46b and the vertical rod-shaped main bodies 66 of the lifting raising/lowering bodies 65A and 65B downward integrally and in synchronization to a lowering limit level at which the belt coupling plates 68 of the vertical rod-shaped main bodies 66 are put in close proximity to the floor surface of the storage area. Next, both the X- and Y-direction drive means 22 and 36 are put in operation to move the respective gripping raising/lowering bodies 45a to 46b, at positions separated by just equal distances from the four corners of the container C to be retrieved (the four corners of the respective flange portions F1 to F3), in synchronization closer toward the center position P of the container C to be retrieved to thereby fit the fitting portions 47 of the respective gripping raising/lowering bodies 45a to 46b to the respective corners of the container C to be retrieved and put the anti-slip strip bodies 48 at the respective right-angled side edges of the respective fitting portions 47 in press contact with the respective corners of the container C to be retrieved as shown in FIG. 23.

Although points of action of moving the gripping raising/lowering bodies 45a to 46b inward in the X direction and the Y direction in this process are the positions of the slide blocks 50 at the supporting member 43a to 44b sides with respect to the raising/lowering guide rails 49 attached to the gripping raising/lowering bodies 45a to 46b and when the container C on the floor surface of the storage area is being gripped, the gripping raising/lowering bodies 45a to 46b are in cantilevered states of extending long downward from the positions of the slide blocks 50, which are at the supporting member 43a to 44b sides and are the points of action, the four gripping raising/lowering bodies 45a to 46b are coupled to each other in the X direction and the Y-direction by the parallelogram link mechanisms 81A and 81B and the parallelogram link mechanisms 85A and 85B, respectively, so that the parallelogram link mechanisms 81A, 81B, 85A, 85B hold the gripping raising/lowering bodies 45a, 45b, 46a, 46b that are aligned in parallel in the X direction and Y direction in the mutually parallel orientations and, at the same time, gravity acting on the central raising/lowering link members 82 and the central raising/lowering link members 88 at the centers of the link mechanisms impel the gripping raising/lowering bodies 45a to 46b in directions of moving closer to each other in the X direction and the Y direction via the respective rocking parallel links 83a to 84b and 89a to 90b, and therefore the respective corners of stacked containers C can be gripped reliably by the four gripping raising/lowering bodies 45a to 46b.

In this process, the vertical rod-shaped main bodies 66 of the lifting raising/lowering bodies 65A and 65B move rectilinearly in the X direction and closer toward a width-direction center position of two side surfaces, parallel to the Y direction, of the container C to be retrieved, and due to the two upper- and lower-stage support units 67a and 67b supported by the vertical rod-shaped main bodies 66 being of structures such that, in a planar view as shown in FIG. 23, the pin-shaped supporting implements 76a and 76b protrude further inward than X-direction contacting surfaces (surfaces of the anti-slip strip bodies 48) of the gripping raising/lowering bodies 45a and 45b and the gripping raising/lowering bodies 46a and 46b at the respective sides in the Y direction, in the process in which the fitting portions 47 of the gripping raising/lowering bodies 45a to 46b fit onto the respective corners of the container C to be retrieved as described above, each pin-shaped supporting implement, which, among the pin-shaped supporting implements 76a and 76b included in the two upper- and lower-stage support units 67a and 67b, is at a position where even a portion of a distal end surface thereof contacts an outer side surface of the container C to be retrieved, that is, a peripheral side surface of any of the respective flange portions F1 to F3, is received and retained by the peripheral side surface of the corresponding flange portion among the respective flange portions F1 to F3 and is thus retracted relatively into the casing 75 against an impelling force of the extension coil spring 78 while pin-shaped supporting implements besides the above are inserted both above and underneath the respective flange portions F1 to F3 in protruded states in accordance with the movements of the support units 67a and 67b.

In the example shown in FIG. 24 and FIG. 25, among the stacked containers C to be retrieved, a container C1 at a lowest stage and a container C2 immediately thereabove are adjacent to the lower-side support units 67b and two upper- and lower-stage containers Cu and Cd positioned at intermediate heights are adjacent to the upper-side support units 67a, and among the pin-shaped supporting implements 76a and 76b in the two upper- and lower-stage support units 67a and 67b, the several pin-shaped supporting implements 76a and 76b, which will face the vertically overlapped flange portions F3 and F1, between the two upper- and lower-stage containers C1 and C2 and between the two upper- and lower-stage containers Cu and Cd adjacent to the respective support units 67a and 67b, and the second-stage flange portions F2 of the lower-side containers C1 and Cd, will be retracted relatively into the casings 75 against the impelling forces of the extension coil springs 78 and the other pin-shaped supporting implements 76a and 76b will be inserted between the respective upper and lower flange portions F1 and F2 and between the respective upper and lower flange portions F2 and F3 of the respective containers C1, C2, Cu, and C2 while remaining in the protruded states (state shown in the left half of FIG. 24).

Next, when the raising/lowering drive means 57A and 57B are put in operation and the gripping raising/lowering bodies 45a to 46b and the vertical rod-shaped main bodies 66 of the lifting raising/lowering bodies 65A and 65B that are at the lowering limit level are moved upward in synchronization to a raising limit level, the pin-shaped supporting implements, which, among the pin-shaped supporting implements 76a and 76b of the support units 67a and 67b, are positioned in protruding states directly below the two upper and lower flange portions F1 and F2 at the upper sides of the respective containers C, that is, in the example of FIG. 25, the inner-side pairs of right and left pin-shaped supporting implements 76a indicated in solid black lift up the lowest-stage container C1 and the container Cd of intermediate height via the flange portions F1 and F2 of each by the raising of the support units 67a and 67b in states of being supported by the lower-end belt coupling plates 68 and the intermediate-height receiving members 72 of the vertical rod-shaped main bodies 66. As a matter of course, depending on an interval between the two upper and lower flange portions F1 and F2, an interval between the flange portions F2 and F3, or thicknesses of the flange portions F1 and F2, the lowest-stage container C1 and the intermediate-height container Cd may be lifted up via just one of either of the flange portions F1 and F2 by inner-side pairs of right and left pin-shaped supporting implements 76a or outer-side pairs of right and left pin-shaped supporting implements 76b among the pin-shaped supporting implements 76a and 76b.

As is clear from the above description, when, as mentioned above, the container Cd that is lifted up by the upper-side support units 67a is present, the stacked containers are divided into an upper-side stacked container group having the container Cd as a lowest end and a lower-side stacked container group having the container directly below the container Cd as a highest end, the upper-side stacked container group is lifted up via the lowest-end container C by the upper-side support units 67a and the lower-side stacked container group is lifted up via the lowest-end container C1 by the lower-side support units 67b. Obviously when the number of stages of stacked containers C is low and the container Cd that is lifted up by the upper-side support units 67a as mentioned above is not present, the stacked containers C will be lifted up via the lowest-stage container C1 by the lower-side support units 67b.

The containers C to be retrieved are lifted vertically upward from the floor surface of the storage area by the X-direction pair of lifting raising/lowering bodies 65A and 65B as described above, and in this process, the respective fitting portions 47 of the four gripping raising/lowering bodies 45a to 46b that rise integrally with the lifting raising/lowering bodies 65A and 65B fit onto and grip the four corners of the containers C to be retrieved, and therefore an entirety of the containers C to be retrieved is held in a vertically stacked orientation and tilting of the entirety of the stacked containers C in a lateral direction is prevented.

When the containers C to be retrieved that are positioned by the four gripping raising/lowering bodies 45a to 46b and supported by the X-direction pair of lifting raising/lowering bodies 65A and 65B have been raised to the raising limit level, the main traveling body 2 is moved laterally in Y direction and the secondary traveling body 3 is moved laterally in the X direction on the main traveling body 2 by automatic operation of the conveyance apparatus 1 so that the containers C to be retrieved are horizontally conveyed at a level higher than a maximum height of the containers C stored in stacked states inside the storage area to a position directly above the transferring end portion 7a of the retrieval conveyor 7. When the containers C to be retrieved that are positioned by the four gripping raising/lowering bodies 45a to 46b and supported by the X-direction pair of lifting raising/lowering bodies 65A and 65B have been raised to the raising limit level, the containers C are in a state of penetrating through the secondary traveling body 3 in the vertical direction at the quadrilateral vertical direction through opening portion surrounded by the X-direction pair of main movable bases 21a and 21b and the Y-direction pair of interlocking rod-shaped bodies 32a and 32b.

Thereafter, by actuating the four gripping raising/lowering bodies 45a to 46b and the X-direction pair of lifting raising/lowering bodies 65A and 65B by procedures directly reverse those of the operation of lifting up the containers C to be retrieved from the floor surface of the storage area, the containers C to be retrieved that are positioned by the four gripping raising/lowering bodies 45a to 46b and supported by the X-direction pair of lifting raising/lowering bodies 65A and 65B can be lowered onto the transferring end portion 7a of the retrieval conveyor 7. Also, to store a container to be stored, which has been conveyed in by the storage conveyor 6 to the transferring end portion 6a, at an available space inside the storage area, the container to be stored that is positioned on the transferring end portion 6a of the storage conveyor 6 is lifted up by the four gripping raising/lowering bodies 45a to 46b and the X-direction pair of lifting raising/lowering bodies 65A and 65B to the raising limit level by the same procedures as when lifting up the containers C to be retrieved from the floor surface of the storage area, and thereafter conveyed to the storage target position by automatic operation of the conveyance apparatus 1 and thereafter the container to be stored is lowered onto the storage target available space by the same procedures as when lowering the containers C to be retrieved onto the transferring end portion 7a of the retrieval conveyor 7.

With the storage facility described above, a single container or an entirety of a plurality of containers in a stacked state can be retrieved by conveying from a specific position on the storage area to the transferring end portion 7a of the retrieval conveyor 7 or stored by conveying from the transferring end portion 6a of the storage conveyor 6 to an available space on the storage area, and as another container storage/retrieval method, an individual retrieval method of retrieving just a specific container C among stacked containers, an individual storage method of storing just a specific container C among stacked containers positioned on the transferring end portion 6a of the storage conveyor 6, or a method of stacking and storing a container to be stored on another container of the same planar size stored inside the storage area, etc., may be implemented.

In an individual storage/retrieval method, the four gripping raising/lowering bodies 45a to 46b and the X-direction pair of lifting raising/lowering bodies 65A and 65B are lowered, with respect to stacked containers C that include a container to be stored or retrieved individually, close to a bottom surface level of the container to be stored or retrieved individually and thereafter made to perform the container lift-up operation described above. Consequently, stacked containers C in a state where the container to be stored or retrieved individually is positioned at the lowest end can be raised to the raising limit level, and therefore thereafter, the stacked containers C are conveyed horizontally to a position directly above a targeted lowering position (the transferring end portion 7a of the retrieval conveyor 7 or an available space on the storage area or a container of the same planar size stored in the storage area) and the stacked containers C are lowered to the targeted lowering position. Thereafter, the four gripping raising/lowering bodies 45a to 46b and the X-direction pair of lifting raising/lowering bodies 65A and 65B that are released laterally to the sides from the stacked containers C are not raised to the raising limit level but are made to perform an operation of lifting up, from among the lowered stacked containers C, all containers besides the container to be stored or retrieved individually that are stacked above the lowest-end container, which is the container to be stored or retrieved individually. Consequently, just the container to be stored or retrieved individually is left at the targeted lowering position and the storage/retrieval operation of the container to be stored or retrieved individually is completed. The containers C, which are not to be stored or retrieved individually and have been lifted up leaving the container to be stored or retrieved individually, may be conveyed to and lowered at the original location or a new location by the same procedures described above.

In lowering a single container C or stacked containers C to be stored or retrieved, which is or are positioned by the four gripping raising/lowering bodies 45a to 46b and supported by the X-direction pair of lifting raising/lowering bodies 65A and 65B, at a target location as described above, by controlling the raising/lowering drive means 57A and 57B so that after the container or containers C to be stored or retrieved is received and retained at the target location, the support units 67a and 67b are lowered slightly and each of the pin-shaped supporting implements 76a and 76b supporting the flange portion F1 or F2 of the container C to be stored or retrieved becomes slightly separated downward from the flange portion F1 or F2, excessive sliding contact between each of the flange portions F1 and F2 of the container or containers C to be stored or retrieved and the pin-shaped supporting implement 76a or 76b supporting it can be avoided when moving the four gripping raising/lowering bodies 45a to 46b and the lifting raising/lowering bodies 65A and 65B to separate outward from the container or containers C to be stored or retrieved.

However, with the configuration described above, the support units 67a and 67b are just supported by gravity at fixed positions with respect to the vertical rod-shaped main bodies 66 of the lifting raising/lowering bodies 65A and 65B and can move freely upward against gravity from the fixed positions, and thus even if the vertical rod-shaped main bodies 66 of the lifting raising/lowering bodies 65A and 65B are in a situation of stopping at positions further lowered from ideal positions as mentioned above, the support units 67a and 67b are supported by the container or containers C to be stored or retrieved via each of the pin-shaped supporting implements 76a and 76b that was positioned at an upper side of the flange portion F1 or F2 of the container C to be stored or retrieved and the vertical rod-shaped main bodies 66 of the lifting raising/lowering bodies 65A and 65B are simply lowered relative to the support units 67a and 67b so that each of the pin-shaped supporting implements 76a and 76b that was positioned at an upper side of the flange portion F1 or F2 of the container C to be stored or retrieved will not press down on the flange portion F1 or F2 from above.

The container raising/lowering conveyance apparatus according to the present invention can be utilized effectively for stacked container storage/retrieval operations in a storage facility for stacked containers of various sizes.

What is claimed is:

1. A container raising/lowering conveyance apparatus comprising:

four gripping raising/lowering bodies capable of being respectively horizontally fitted to and detached from four corners of an article-conveyance container, each gripping raising/lowering body including a fitting portion having an angle-shaped transverse section that horizontally fits onto an associated corner of the article-conveyance container along adjacent vertical side faces of the container, central raising/lowering link members, capable of being raised and lowered, are disposed at central positions of respective edges of a right-angled parallelogram surrounded by the four gripping raising/lowering bodies in a planar view, and each of the central raising/lowering link members and the gripping raising/lowering bodies at both sides thereof are coupled to each other by at least one pair of upper and lower rocking parallel links capable of rocking in the vertical direction.

2. The container raising/lowering conveyance apparatus according to claim 1, wherein, in a state where the gripping raising/lowering bodies at both sides coupled to the central raising/lowering link members are separated furthest from each other, the rocking parallel links are inclined obliquely upward from the corresponding central raising/lowering link members toward the gripping raising/lowering bodies at both sides.

3. The container raising/lowering conveyance apparatus according to claim 1, wherein a supporting structure is provided with an X-direction pair of main movable bases, capable of moving closer to and away from each other in an X direction, among the X direction and a Y direction that are parallel to mutually perpendicular side edges of a right-angled parallelogram surrounded by the four gripping raising/lowering bodies in a planar view, the main movable bases are provided respectively with Y-direction pairs of secondary movable bases capable of being moved closer to and away from each other in the Y direction, the four gripping raising/lowering bodies are respectively and separately supported by the four secondary movable bases so as to be capable of being raised and lowered, the central raising/lowering link members, positioned centrally between respective Y-direction pairs of gripping raising/lowering bodies, are supported, so as to be capable of being raised and lowered, by vertical rod-shaped main bodies which are supported by the respective main movable bases so as to be capable of being raised and lowered, upper end portions of the vertical rod-shaped main bodies and upper end portions of the Y-direction pairs of gripping raising/lowering bodies at both sides of the vertical rod-shaped main bodies are coupled by coupling means, which allow the Y-direction pairs of gripping raising/lowering bodies to be moved closer to and away from each other in the Y direction, and the respective main movable bases are provided with raising/lowering drive means that drive the raising and lowering of the X-direction pair of the vertical rod-shaped main bodies supported by the respective main movable bases.

* * * * *